United States Patent [19]

Nagai et al.

[11] Patent Number: 5,158,366
[45] Date of Patent: Oct. 27, 1992

[54] REFRACTORY MONITORING TEMPERATURE SENSOR AND REFRACTORY EROSION LOCATION MEASURING DEVICE

[75] Inventors: Nobuyuki Nagai; Akio Arai; Takashi Moriyama, all of Kobe; Koji Shimomura; Toshitake Okada, both of Kakoagawa; Yasuo Yoshida, Kobe; Shuji Kitayama, Kobe; Shigeichi Miki, Kobe; Yoshihiko Isshiki, Kobe; Yoshiharu Hiroki, Akashi; Kiyoshi Yamauchi, Kobe, all of Japan

[73] Assignee: Kabushiki Kaisha Kobe Seiko Sho, Kobe, Japan

[21] Appl. No.: 744,833

[22] Filed: Aug. 13, 1991

Related U.S. Application Data

[63] Continuation of Ser. No. 530,271, May 30, 1990, abandoned.

[30] Foreign Application Priority Data

May 31, 1989 [JP] Japan ................................. 1-135756
May 31, 1989 [JP] Japan ................................. 1-135757
May 31, 1989 [JP] Japan ................................. 1-135758
Jun. 20, 1989 [JP] Japan ................................. 1-155594

[51] Int. Cl.$^5$ ........................... H01C 7/04; H05B 1/02
[52] U.S. Cl. .................................... 374/183; 374/185; 374/208; 338/28
[58] Field of Search ............... 374/183, 184, 185, 208; 323/294; 338/26, 28

[56] References Cited

U.S. PATENT DOCUMENTS

| | | | |
|---|---|---|---|
| 2,021,491 | 11/1935 | Ruben | 374/183 X |
| 3,668,373 | 6/1972 | Laing | 374/183 X |
| 4,317,367 | 3/1982 | Schonberger | 374/185 |
| 4,349,958 | 9/1982 | Hakansson et al. | 374/185 X |
| 4,365,229 | 12/1982 | Tokarz | 338/28 |
| 4,420,974 | 12/1983 | Lord | 374/185 X |
| 4,479,026 | 10/1984 | Brixy et al. | 374/185 X |
| 4,491,822 | 1/1985 | Davis | 338/28 |
| 4,924,114 | 5/1990 | Ruhle | 374/185 X |

FOREIGN PATENT DOCUMENTS

170032 4/1956 Japan .

*Primary Examiner*—Stuart S. Levy
*Assistant Examiner*—Joseph A. Rhoa
*Attorney, Agent, or Firm*—Oblon, Spivak, McClelland, Maier & Neustadt

[57] ABSTRACT

A compact and inexpensive refractory monitoring temperature sensor and a compact and inexpensive refractory erosion location measuring device which can effect continuous detection of erosion over a wide range and specification of a location of an erosion and further can be re-used and used continuously. The temperature sensor includes at least two metal members and an insulating substance (2) filled between the metal members. The sensor detects a condition of an erosion of a refractory not from a melting breakdown of the sensor but from a variation in insulation resistance of the insulating substance which arises from a high temperature of the refractory due to erosion of the refractory. The measuring device incorporates such temperature sensor and discriminates an amount and a location of erosion of the refractory from a variation in insulation resistance between the metal members.

5 Claims, 26 Drawing Sheets

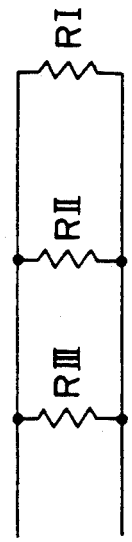
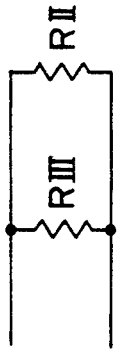
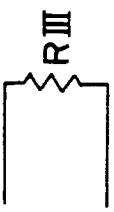
$$\frac{1}{R_{12}} = \frac{1}{R_I} + \frac{1}{R_{II}} + \frac{1}{R_{III}}$$
$$\frac{1}{R_{34}} = \frac{1}{R_{II}} + \frac{1}{R_{III}}$$
$$\frac{1}{R_{56}} = \frac{1}{R_{III}}$$
FIG. 16a
FIG. 16b
FIG. 16c
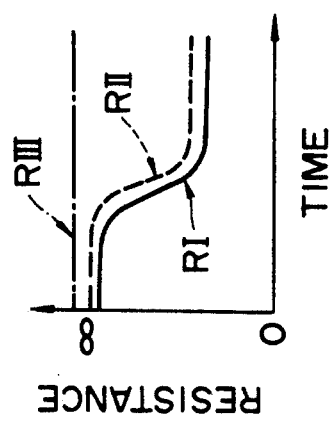
FIG. 17c
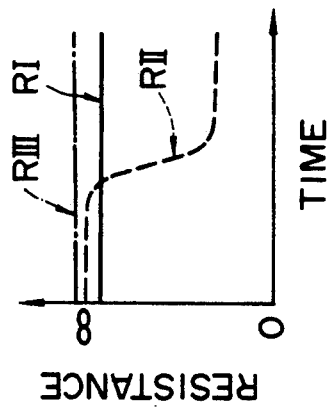
FIG. 17b
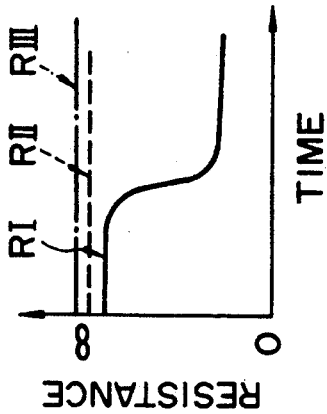
FIG. 17a

REFRACTORY MONITORING TEMPERATURE SENSOR AND REFRACTORY EROSION LOCATION MEASURING DEVICE

This application is a continuation of application Ser. No. 07/530,271, filed on May 30, 1990, now abandoned.

BACKGROUND OF THE INVENTION

1. Field of the Invention

This invention relates to a refractory monitoring temperature sensor and a refractory erosion location measuring device suitable for use for the measurement of a temperature of a wide area and for the monitoring of erosion of a lining refractory in a high temperature furnace such as a combustion furnace or a reactor furnace, a refractory vessel for containing and/or conveying a high temperature molten substance such as a hot metal pan, a blast pan, a converter and a metal mixing vessel, a trough for a high temperature molten substance such as a blast furnace main trough and a hot metal furnace trough in the iron industry, or a continuous fusing furnace in various ceramic industries (of glass, cement and so forth).

2. Description of the Prior Art

It is a very important point for the safe operation of a furnace or the like and for the quality control of products to accurately and rapidly detect a temperature condition of a lining refractory of such a high temperature furnace, a refractory vessel, a trough or the like as mentioned above. To this end, various sensors and monitoring devices have been conventionally proposed to monitor a temperature and/or an erosion condition of a refractory.

For example, a multipoint temperature sensor is disclosed in Japanese Utility Model Laid-Open No. 57-170032 wherein a plurality of temperature measuring members each constituted from a sheathed thermocouple, a sheathed temperature measuring resistor or the like are disposed in a jacket protecting tube such that temperature sensing portions thereof are displaced from each other in a longitudinal direction of the jacket protecting tube to permit detection of temperatures at several points. Such sensors are disposed in parallel to a thicknesswise direction of a refractory to detect temperatures at various points so that an amount of erosion of the refractory may be monitored.

Meanwhile, a hot metal trough monitoring method is disclosed in Japanese Patent Laid-Open No. 53-122608 wherein a sensor which can detect a temperature variation as a variation in electric resistance is disposed at a location of a hot metal trough at which the wear of the material is hard such as a connecting point between trough materials and a hot metal surface level. A fixed electric current flow is supplied to the sensor, and a resistance of the sensor is measured. If there is some bleeder or some wear in a trough material, then the temperature at an outer wall portion of the trough rises, and consequently, also the electric resistance of the sensor varies. A possible accident which may arise from a bleeder or wear of the trough by erosion can be prevented by detecting such variation in electric resistance of the sensor.

A hot metal trough monitoring device is disclosed in Japanese Utility Model Publication No. 57-46355 wherein a sensor is embedded in a trough material of a hot metal trough at a location at which an erosion, a crack or the like likely occurs. The sensor is constituted from a tubular conductor and a wire-like conductor extending through the center of the tubular conductor and held in position by an insulating substance filled in the tubular conductor. Then, if a damage such as an erosion or a crack appears in a refractory of the hot metal trough, then the sensor will touch with hot metal and the insulating substance in the sensor may be melted to put the tubular conductor and the wire-like conductor into a mutually conducting condition. A possible accident arising from bleeder or the like can thus be prevented by electrically detecting such conducting condition between the conductors.

An erosion monitoring method for an iron runner of a blast furnace is disclosed in Japanese Patent Laid-Open No. 60-89701 wherein a conductor is embedded in a monolithic refractory at a lower portion of a trough material of an iron runner of a blast furnace, and an ac voltage is applied between a conductor and the ground while a variation in electric current flowing between the conductor and the ground is detected so that erosion of the iron runner is monitored from a detection value of the variation.

The conventional sensors and erosion monitoring means described above, however, individually have the following problems.

In particular, with the sensor disclosed in Japanese Utility Model Laid-Open No. 57-170032, since measurement is conducted by temperature sensing portions of temperature sensing members disposed at a plurality of different points in a longitudinal direction of a jacket protecting tube, only one-dimensional discrete measurement is available, and where there is a hot spot between adjacent such temperature sensing portions, it is impossible to measure such spot. Further, since a large number of sheathed couples or sheathed temperature measuring resistors are accommodated in the jacket protecting tube, the sensor has a comparatively large diameter, which makes it impossible to mount the sensor at a location of a narrow or small spacing. Besides, the sensor has a large bending radius, which makes working and handling of the sensor difficult. Furthermore, where a high temperature above 1,200° C. is to be measured, a high production cost is required for the sensor because a thermocouple of the R type (platinum-platinum rhodium) is normally employed.

Meanwhile, with the monitoring method disclosed in Japanese Patent Laid-Open No. 53-122608, while a resistance variation at 1,200° C. to 1,500° C. or so must be detected in order to detect an abnormal erosion, the variation in resistance of a conductor will be so small in such temperature range that it cannot be detected well. Further, where erosion is monitored over a wide range, the location of such erosion cannot be specified.

With the monitoring device disclosed in Japanese Utility Model Publication No. 57-46355, since an erosion is detected from a melting breakdown of a sensor, the sensor cannot be re-used nor used continuously, and besides, information of an erosion is not obtained until the sensor is melted into a breakdown condition. Also, where erosion is monitored over a wide range, the location of such erosion cannot be specified.

With the monitoring method disclosed in Japanese Patent Laid-Open No. 60-89701, since detection of an erosion is conducted in accordance with point measurement, if it is intended to increase the number of points for measurement, then conductors must necessarily be embedded by such number, which will result in increase in overall size of the arrangement. Further, since a variation in electric resistance when a conductor touches with hot metal is detected, a sensing portion of the sensor can be used only once, and accordingly, the sensor cannot be re-used nor used continuously as in the case of the monitoring device described above. In addition, due to a high temperature of hot metal, a shunt error (deterioration in insulation resistance) of a refractory sometimes occurs, which will cause an error in detection.

SUMMARY OF THE INVENTION

It is an object of the present invention to provide a compact and inexpensive refractory monitoring temperature sensor which can effect continuous detection of erosion over a wide range and specification of a location of an erosion and further can be re-used and used continuously.

It is an object of the present invention to provide a compact and inexpensive refractory erosion location measuring device which can effect continuous detection of erosion over a wide range and specification of a location of an erosion and further can be re-used and used continuously.

In order to attain the objects, according to an aspect of the present invention, there is provided a refractory monitoring temperature sensor, which comprises a pair of metal members disposed in an opposing relationship to each other with a predetermined fixed distance left therebetween, the metal members being disposed over a monitoring range of a refractory in which the refractory is to be monitored by the refractory monitoring temperature sensor, and an insulating substance filled between the metal members and having an insulation resistance which decreases when the insulating substance is put into a high temperature condition such that a temperature within the monitoring range of the refractory is detected in accordance with a variation in resistance between the metal members.

With the refractory monitoring temperature sensor, since a condition of an erosion or the like of the refractory is detected not from a melting breakdown of the sensor itself but from a variation in insulation resistance of the insulating substance arising from a high temperature of the refractory due to erosion or the like of the refractory, the sensor itself does not suffer from a breakdown and accordingly can be re-used and used continuously. Besides, the refractory monitoring temperature sensor can sense a temperature over the entire area over which the metal members thereof are disposed. In addition, monitoring of the refractory with a high degree of accuracy can be realized with the sensor of a simple and inexpensive construction.

The metal members may be opposed to each other only within a particular region within the monitoring range of the refractory so that a location at which a temperature rise occurs, that is, a location of an erosion of the refractory, can be specified readily.

The metal members may be a pair of metal plates having a high melting point and disposed in a parallel opposing relationship to each other so that monitoring over a very wide two-dimensional range of the refractory can be realized.

According to another aspect of the present invention, there is provided a refractory monitoring temperature sensor, which comprises a plurality of pairs of metal members disposed in an opposing relationship to each other with a predetermined fixed distance left therebetween, the metal members being disposed in a displaced relationship from each other in a monitoring range of a refractory in which the refractory is to be monitored by the refractory monitoring temperature sensor, and an insulating substance filled between the metal members in each pair and having an insulation resistance which decreases when the insulating substance is put into a high temperature condition such that a temperature within the monitoring range of the refractory and a location at which a temperature rise occurs are detected in accordance with a variation in resistance between the metal members in each pair.

With the refractory monitoring temperature sensor, a variation in resistance between arbitrary ones in pair of the metal members disposed in a displaced relationship from each other is detected, and it is discriminated in which pair of the metal members a resistance variation has occurred. Consequently, a temperature in the monitoring range of the refractory and a location at which a temperature rise occurs and hence a location of an erosion of the refractory are specified, and consequently, monitoring of an erosion condition over a wide range can be achieved. Accordingly, where the refractory monitoring temperature sensor is applied for the monitoring of erosion of a refractory, an erosion condition of the refractory can be grasped with certainty. Thus, the refractory monitoring temperature sensor can be well applied to various applications having a refractory such as a hot metal through or a blast furnace, which assures a safe operation of the application.

According to a further aspect of the present invention, there is provided a refractory erosion location measuring device, which comprises a sensor disposed in a monitoring range of a refractory in which the refractory is to be monitored by the sensor, the sensor including a plurality of metal members disposed independently of each other and in a predetermined spaced relationship from each other, the sensor further including an insulating substance filled between the metal members and having an insulation resistance which decreases when the insulating substance is put into a high temperature condition, a resistance measuring means for measuring insulation resistances between the metal members of the sensor, a discriminating means for discriminating an amount and a location of erosion in the refractory in accordance with a result of measurement from the resistance measuring means, a sensor abnormality detecting metal member disposed continously in the sensor over the monitoring range of the refractory, and a sensor abnormality detecting means for detecting an abnormality of the sensor in accordance with a resistance between the opposite ends of the sensor abnormality detecting metal member.

With the refractory erosion location measuring device, a condition of erosion of the refractory is detected not from a melting breakdown of the sensor itself but from a variation in insulation resistance (occurrence of a shunt resistance) of the insulating substance arising from a high temperature of the refractory due to erosion or the like of the refractory. In particular, insulation resistances between the metal members are measured by the resistance measuring means, and in accordance with a result of such measurement, the discriminating means discriminates an amount of erosion from a variation in insulation resistance and discriminates between which ones of the metal members a resistance variation has occurred in order to specify a location at which an erosion occurs.

Meanwhile, the resistance between the opposite ends of the sensor abnormality detecting metal member disposed continuosly over the monitoring range of the refractory normally presents a low value if there is no abnormality in the sensor. On the other hand, if disconnection or breaking of a wire is caused at some location in the sensor by, for example, a thermal stress or the like, then similar disconnection will occur at a corresponding location of the sensor abnormality detecting metal member in the monitoring range of the refractory. In this instance, the opposite ends of the sensor abnormality detecting metal member are put out of a conducting condition, and consequently, the resistance between them exhibits an infinite value. Accordingly, by monitoring the resistance between the opposite ends of the sensor abnormality detecting metal member by the sensor abnormality detecting means, an abnormality of the sensor such as breaking of a wire can be detected.

Accordingly, the sensor itself does not suffer from a breakdown and accordingly can be re-used and used continuously. Besides, the sensor of the refractory erosion location measuring device can sense a temperature over the entire area over which the metal members thereof are disposed. In addition, monitoring of the refractory with a high degree of accuracy can be realized with the refractory erosion location measuring device of a simple and inexpensive construction. Accordingly, determination of a timing for the spraying repair or replacement of the refractory or specification of a location for such spraying repair or replacement can be effected with certainty, and a possible serious accident arising from leakage of hot metal can be prevented. Further, since an abnormality such as breaking of a wire or melting breakdown of the sensor is detected, it is possible to determine reliability of of the sensor and to discriminate a timing for the replacement of the sensor, and the reliability of the device itself can be improved significantly.

According to a still further aspect of the present invention, there is provided a refractory erosion location measuring device, which comprises a sensor disposed in a monitoring range of a refractory in which the refractory is to be monitored by the sensor, the sensor including a pair of metal members disposed in an opposing relationship to each other with a predetermined fixed distance left therebetween, the sensor further including an insulating substance filled between the metal members and having an insulation resistance which decreases when the insulating substance is put into a high temperature condition, a resistance measuring means for measuring a resistance between two arbitrary ones of the four opposite ends of the pair of metal members of the sensor, and a calculating means for calculating an amount and a location of erosion in the refractory in accordance with a result of measurement from the resistance measuring means.

With the refractory erosion location measuring device, a condition of erosion of the refractory is detected not from a melting breakdown of the sensor itself but from a variation in insulation resistance (occurrence of a shunt resistance) of the insulating substance arising from a high temperature of the refractory due to erosion or the like of the refractory. In particular, insulation resistances between two arbitrary ones of the four ends of the pair of metal members are measured by the resistance measuring means, and in accordance with a result of such measurement, the calculating means calculates an amount of erosion from a variation in insulation resistance and calculates a location of an erosion from resistances of the pair of such metal members and/or the resistance between the opposite ends of the metal members in order to specify the location at which an erosion occurs.

Accordingly, the sensor itself does not suffer from a breakdown and accordingly can be re-used and used continuously. Besides, the sensor of the refractory erosion location measuring device can sense a temperature over the entire area over which the metal members thereof are disposed. In addition, monitoring of the refractory with a high degree of accuracy can be realized with the refractory erosion location measuring device of a simple and inexpensive construction. Accordingly, determination of a timing for the spraying repair or replacement of the refractory or specification of a location for such spraying repair or replacement can be effected with certainty, and a possible serious accident arising from leakage of hot metal can be prevented.

According to a yet further aspect of the present invention, there is provided a refractory erosion location measuring device, comprising a sensor disposed in a monitoring range of a refractory in which the refractory is to be monitored by the sensor, the sensor including a plurality of metal members disposed in parallel to each other with a predetermined fixed distance left therebetween and cut at different positions in a longitudinal direction of the sensor into pairs of metal member sections, the sensor further including an insulating substance filled between the metal members and having an insulation resistance which decreases when the insulating substance is put into a high temperature condition, a resistance measuring means for measuring an insulation resistance between two arbitrary ones of the metal member sections of the metal members of the sensor, and a discriminating means for discriminating an amount and a location of erosion in the refractory in accordance with a result of measurement from the resistance measuring means.

With the refractory erosion location measuring device, a condition of erosion of the refractory is detected not from a melting breakdown of the sensor itself but from a variation in insulation resistance (occurrence of a shunt resistance) of the insulating substance arising from a high temperature of the refractory due to erosion or the like of the refractory. In particular, insulation resistances between two arbitrary ones of the plurality of metal members are measured by the resistance measuring means, and in accordance with a result of such measurement, the discriminating means calculates an amount of erosion from a variation in insulation resistance and discriminates between which ones of the metal members a resistance variation has occurred in order to specify the location at which an erosion occurs.

Accordingly, the sensor itself does not suffer from a breakdown and accordingly can be re-used and used continuously. Besides, the sensor of the refractory erosion location measuring device can sense a temperature over the entire area over which the metal members thereof are disposed. In addition, monitoring of the refractory with a high degree of accuracy can be realized with the refractory erosion location measuring device of a simple and inexpensive construction. Accordingly, determination of a timing for the spraying repair or replacement of the refractory or specification of a location for such spraying repair or replacement can be effected with certainty, and a possible serious accident arising from leakage of hot metal can be prevented.

The above and other objects, features and advantages of the present invention will become apparent from the following description and the appended claims, taken in conjuction with the accompanying drawings in which like parts are denoted by like reference characters all through the drawings.

BRIEF DESCRIPTION OF THE DRAWINGS

FIGS. 16a, 16b and 16c are equivalent circuit diagrams individually illustrating relationships between an insulation resistance and a partial resistance in the refractory monitoring temperature sensor shown in FIG. 12;

FIGS. 17a, 17b and 17c are graphs illustrating operation of the refractory monitoring temperature sensor shown in FIG. 12 corresponding to FIGS. 16a, 16b and 16c, respectively;

DETAILED DESCRIPTION OF THE PREFERRED EMBODIMENTS

Figure 1:
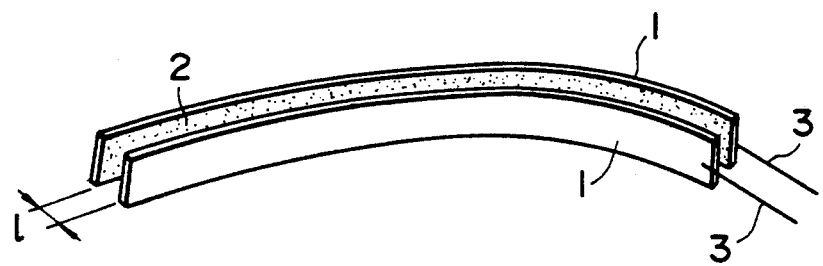
FIG. 1 is a perspective view of a refractory monitoring temperature sensor to which the present invention is applied.
Figure 2:
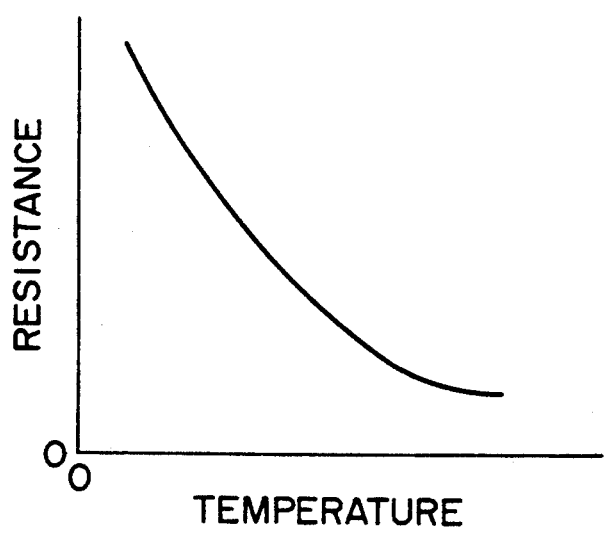
FIG. 2 is a graph illustrating a characteristic of an insulator of the refractory monitoring temperature sensor shown in FIG. 1.

Referring first to FIG. 1, there is shown a refractory monitoring temperature sensor to which the present invention is applied. The refractory monitoring temperature sensor shown includes a pair of metal members 1 extending in a longitudinal direction of the sensor and disposed in an opposing relationship to each other with a fixed opposing area with a fixed distance l left therebetween. The metal members 1 may extend linearly or otherwise in a non-linear or curved condition as seen in FIG. 1 over a range of a refractory not shown over which the refractory is to be monitored. The refractory monitoring temperature sensor further includes an insulator or insulating substance 2 filled between the metal members 1. The insulator 2 is formed from a substance which has an insulation resistance which decreases (a shunt resistance occurs) as a high temperature condition is entered as seen in FIG. 2 and which always presents a same characteristic even if it repetitively undergoes a temperature variation between high and low temperatures. Such insulator 2 may be, for example, magnesium oxide (MgO) or alumina of a high purity (99.8% in purity) which is particularly effective in a high temperature region (1,300° C.). A pair of lead wires 3 are individually connected to the metal members 1 so that a variation in resistance between the metal members 1 in pair may be detected by way of the lead wires 3.

With the temperature sensor having the construction described above, the resistance between the metal members 1 which is detected by way of the lead wires 3 exhibits a very high value (refer to FIG. 2) when the temperature sensor is low in temperature over the entire region in the longitudinal direction thereof. However, if the temperature rises at an arbitrary location of the temperature sensor in the longitudinal direction, then the resistance varies to a smaller value as seen from FIG. 2. Accordingly, the temperature sensor can detect a temperature rise (hot spot) at an arbitrary location within the entire region in which the metal members 1 in pair are disposed.

Thus, with the temperature sensor described above, a condition of an erosion or the like of a refractory is detected not from a melting breakdown of the sensor itself but from a variation in insulation resistance of the insulator 2 arising from a rise of temperature to a high level as a result of an erosion or the like of the refractory. Consequently, the sensor can be re-used and used continuously and besides can sense a temperature at an arbitrary location within the monitoring region. Further, the sensor can be made compact and produced at a reduced cost. Besides, since a temperature at an arbitrary position in the entire monitoring region can be monitored, there is no necessity of employing a large number of thermocouples or the like as in a conventional refractory monitoring temperature sensor. Consequently, the maximum outer diameter of the sensor can be reduced, which makes it possible to mount the sensor in a narrow or small spacing. Besides, the bending radius of the sensor can be reduced, which makes working and handling of the sensor very easy. In addition, the temperature sensor is based on a novel principle positively making use of a shunt error itself of the insulator 2 and can effect monitoring with a high degree of accuracy.

Figure 3:
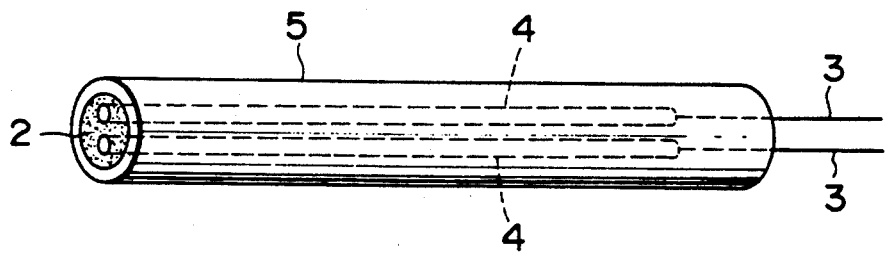
FIG. 3 is a perspective view of another refractory monitoring temperature sensor to which the present invention is applied.
Figure 4:
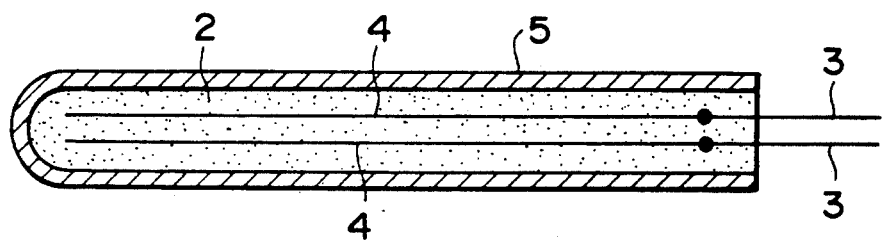
FIG. 4 is a perspective sectional view of the refractor monitoring temperature sensor shown in FIG. 3.

Referring now to FIGS. 3 and 4, there is shown another refractory monitoring temperature sensor to which the present invention is applied. The refractory monitoring temperature sensor shown includes a pair of metal members 4 each in the form of a metal wire having a high melting point such as, for example, a kanthal alloy wire, a chromel wire or an inconel wire. The high melting point metal wires 4 are accommodated in parallel to each other in a protecting tube 5 made of, for example, SUS, inconel or kanthal. An insulator or insulating substance 2 similar to the insulator 2 of the refractory monitoring temperature sensor shown in FIG. 1 is filled between the high melting point metal wires 4 and in the protecting tube 5. Then, a pair of lead wires 3 are individually connected to the high melting point metal wires 4 so that a resistance between the high melting point metal wires 4 may be detected by way of the lead wires 3.

With the refractory monitoring temperature sensor having the construction described above, similar effects to those of the refractory monitory temperature sensor shown in FIG. 1 can be obtained. In addition, since the hight melting point metal wires 4 are employed as the metal members, the temperature sensor itself can be made very compact.

Figure 5:
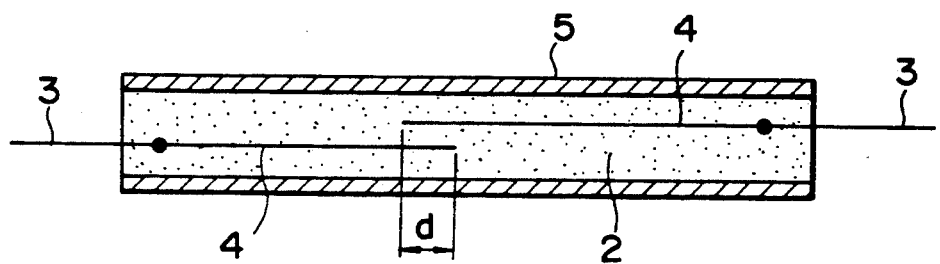
FIG. 5 is a sectional view showing a further refractory monitoring temperature sensor to which the present invention is applied.

Referring now to FIG. 5, there is shown a further refractory monitoring temperature sensor to which the present invention is applied. The refractory monitoring temperature sensor has somewhat similar construction to that of the refractory monitoring temperature sensor shown in FIG. 3 and includes a pair of metal wires 4 having a high melting point. The present refractory monitoring temperature sensor, however, is different from the preceding temperature sensor in that the two high melting point metal wires 4 extend from the opposite longitudinal ends into a protecting tube 5 such that they may be opposed to each other within a particular limited range d in the longitudinal direction of the sensor (within a monitoring range of a refractory not shown).

With the refractory monitoring temperature sensor having such construction, a temperature rise can be detected within the particular range in the entire range of the sensor in the longitudinal direction, which provides an action similar to that of a temperature sensor of the point type. Accordingly, a location of an erosion of a refractory can be specified readily.

Figure 6:
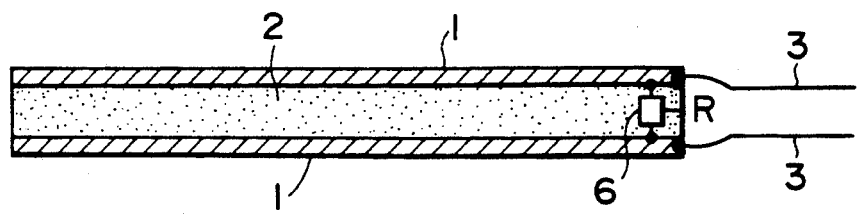
FIG. 6 is a sectional view showing a still further refractory temperature sensor to which the present invention is applied.

Referring now to FIG. 6, there is shown a still further refractory monitoring temperature sensor to which the present invention is applied. The refractory monitoring temperature sensor has somewhat similar construction to the refractory monitoring temperature sensor shown in FIG. 1 and includes a pair of metal members 1. In the present refractory monitoring temperature sensor, however, an insulator or insulating substance 2 is filled between the metal members 1, and a resistor 6 having a resistance value R is connected at the opposite ends thereof to portions of the metal members 1 to which a pair of lead wires 3 are individually connected.

Figure 7:
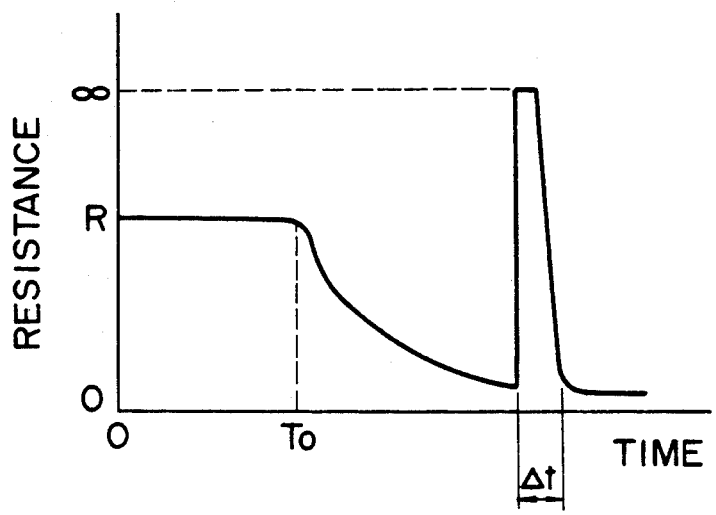
FIG. 7 is a graph illustrating operation of the refractory monitoring temperature sensor shown in FIG. 6.

With the refractory monitoring temperature sensor of the construction, similar effects to those of the temperature sensor shown in FIG. 1 can be attained. Meanwhile, the resistance between the lead wires 3, that is, the resistance between the metal members 1, presents a maximum value R when the temperature is low, but it decreases from the value R as the temperature rises. Accordingly, if disconnection or breaking of a wire occurs in the lead wires 3 during measurement, then the resistance being measured presents such a sudden increase as seen from FIG. 7. Consequently, breaking of the lead wires 3 can be detected from such sudden increase in resistance. Further, since the input impedance in resistance measurement decreases to the value R, also an advantage can be obtained that noises are reduced and the accuracy in measurement is improved. Provision of such resistor 6 can naturally be applied to any of the refractory monitoring temperature sensors described above.

Figure 8:
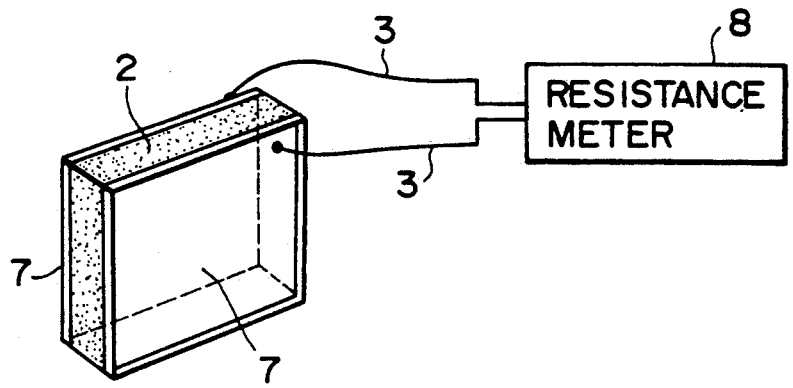
FIG. 8 is a perspective view showing a yet further refractory monitoring temperature sensor to which the present invention is applied.

Referring now to FIG. 8, there is shown a yet further refractory monitoring temperature sensor to which the present invention is applied. The refractory monitoring temperature sensor shown is regarded as a modification to the refractory monitoring temperature sensor shown in FIG. 1 in that the metal members 1 in pair are formed as square or rectangular metal plates having a high melting point and disposed in a parallel opposing relationship to each other.

In particular, the refractory monitoring temperature sensor shown in FIG. 8 includes a pair of square or rectangular metal plates 7 having a high melting point, and an insulator or insulating substance 2 similar to the insulator 2 of the refractory monitoring temperature sensor shown in FIG. 1 is filled between the high melting point metal plates 7. A resistance meter 8 is connected between the metal plates 7 by way of a pair of lead wires 3 so that a variation in resistance between the metal plates 7 may be detected by means of the resistance meter 8.

Figure 9:
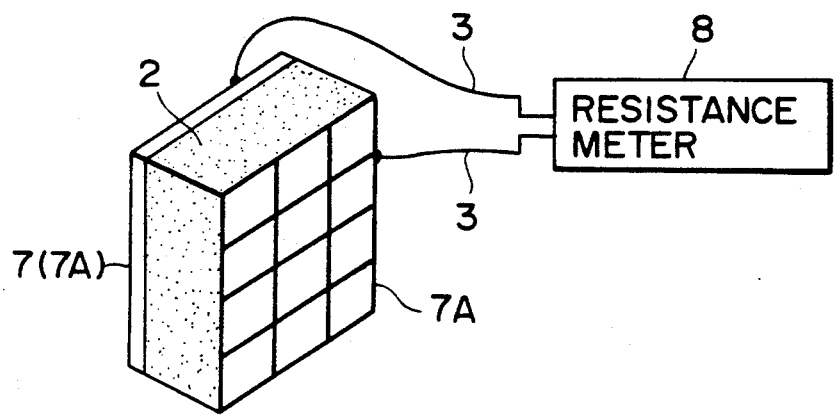
FIG. 9 is a similar view but showing a modification to the refractory monitoring temperature sensor shown in FIG. 8.

FIG. 9 shows a modification to the refractory monitoring temperature sensor shown in FIG. 8. Referring to FIG. 9, the modified refractory monitoring temperature sensor shown has substantially similar construction to the temperature sensor shown in FIG. 8 except that one or both of a pair of metal members are each formed from a metal net or gauze 7A having a high melting point. It is to be noted that, where such high melting point metal net 7A is employed for only one of a pair of metal members, a high melting point metal plate similar to the high melting point metal plates 7 of the refractory monitoring temperature sensor shown in FIG. 8 may be employed as the other metal member.

Figure 10:
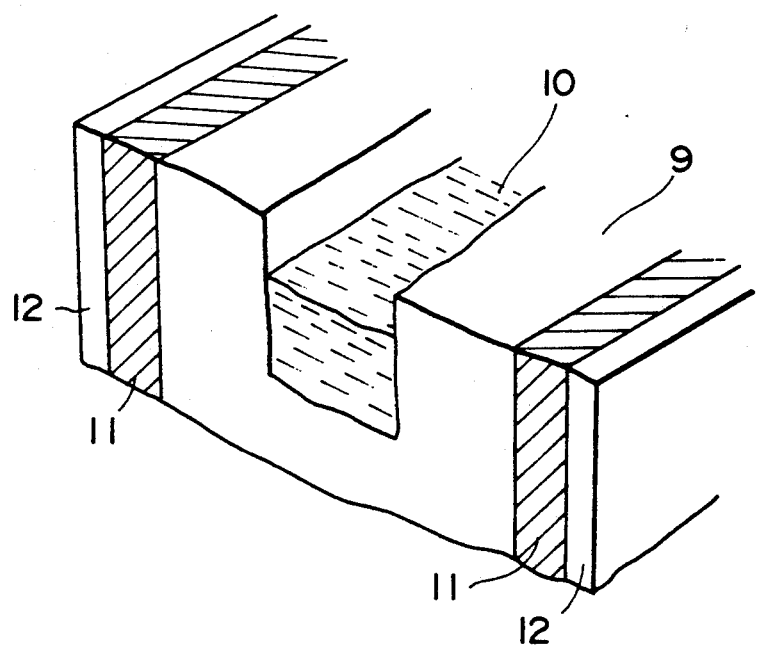
FIG. 10 is a partial perspective sectional view illustrating an application of the temperature sensor shown in FIG. 8 or 9 to a hot metal trough.

Also with the refractory monitoring temperature sensors shown in FIG. 8 and 9, similar effects to those of the refractory monitoring temperature sensor shown in FIG. 1 can be attained. Besides, monitoring of a temperature and an erosion condition can be effected over a very wide two-dimensional range efficiently with a single sensor. Meanwhile, with the temperature sensor which employs the high melting point metal net or nets 7A shown in FIG. 9, the ratio of metal/refractory is decreased when the temperature sensor is actually embedded in a refractory, and consequently, the heat resisting property not only of the sensor itself but also of the refractory in which the sensor is installed can be improved. It is to be noted, however, that, where the high melting point metal net or nets 7A are employed, the erosion detecting faculty (resolution) depends upon a dimension of a mesh of the net or nets An exemplary one of available applications of a temperature sensor of the type shown in FIG. 8 or 9 is shown in FIG. 10. Referring to FIG. 10, a hot metal trough 9 made of fire brick is constituted such that hot metal 10 may flow therein. A pair of temperature sensors 11 which may each be such a temperature sensor as shown in FIG. 8 or 9 are provided on the opposite side walls of the hot metal trough 9, and the opposite outer faces of the temperature sensors 11 are covered with a pair of shells 12. In the construction, a temperature condition of local or entire areas of the fire brick walls of the hot metal trough 9 is monitored as a resistance variation by means of the temperature sensors 11 and the resistance meter 8 to thus monitor an erosion condition of the fire brick walls of the hot metal trough 9.

It is to be noted that, where the outer faces of the temperature sensors 11 are covered with the shells 12 as shown in FIG. 10, it is also possible that the shells 12 may serve each as one of the metal plates 7 or metal net or nets 7A of each of the temperature sensors 11. In this instance, the temperature sensors can be made in a simplified and economical construction and are high in heat resisting property and workability.

Figure 11:
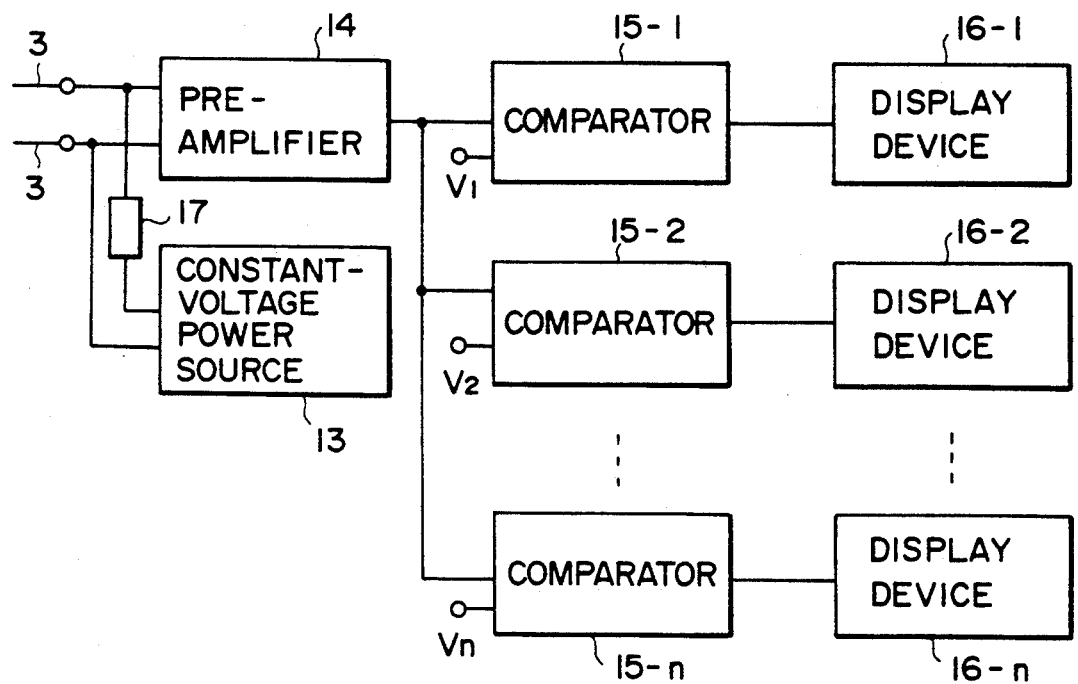
FIG. 11 is a block diagram showing an exemplary detecting displaying circuit for use with a temperature sensor according to the present invention.

FIG. 11 shows an exemplary one of detecting displaying circuits which can be constructed suitably using any one of the temperature sensors described hereinabove. Referring to FIG. 11, the detecting displaying circuit shown includes a constant-voltage power source 13 connected to the metal members of a temperature sensor not shown for applying a constant voltage between the metal members by way of a resistor 17 and the lead wires 3 of the temperature sensor, a pre-amplifier 14 for detecting a voltage applied between the metal members of the temperature sensor by way of the lead wires 3 (corresponding to a resistance between the metal members), n comparators 15-1 to 15-n for comparing a detected voltage from the pre-amplifier 14 with n different reference voltage levels or values $V_1$ to $V_n$, and n display units 16-1 to 16-n for receiving comparison outputs of the comparators 15-1 to 15-n, respectively, and providing indications whether or not the outputs received present an on-state.

The detecting displaying circuit having such construction as described above makes use of the fact that, as shown in FIG. 2, the shunt resistance of the insulator 2 between the metal members decreases monotoneously as the temperature rises and besides such temperature increases in response to an amount of erosion of a refractory involved. Thus, it is possible to grasp a quasicontinuous erosion amount by comparing a resistance value between the metal members measured as a voltage with the plurality of reference values $V_1$ to $V_n$ by means of the comparators 15-1 to 15-n. Further, a current erosion condition can be notified readily and definitely to an operator or the like by displaying results of such comparison by means of the display units 16-1 to 16-n.

Figure 12:
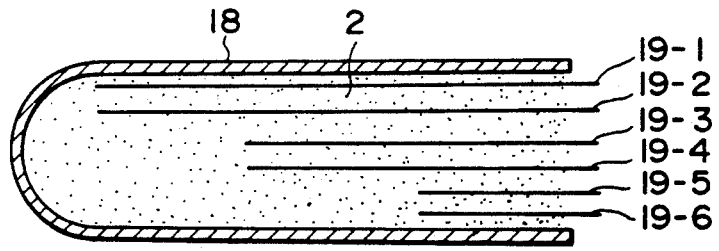
FIG. 12 is a longitudinal sectional view of a yet further refractory monitoring temperature sensor to which the present invention is applied.
Figure 13:
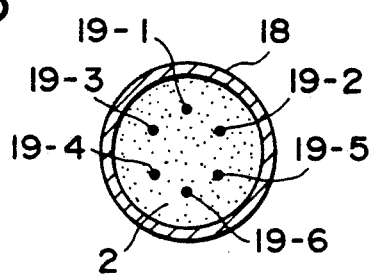
FIG. 13 is a transverse sectional view of the refractory monitoring temperature sensor shown in FIG. 12.

Referring now to FIGS. 12 and 13, there is shown a yet further refractory monitoring temperature sensor to which the present invention is applied. The refractory monitoring temperature sensor shown includes three pairs of conductors or metal members 19-1 and 19-2, 19-3 and 19-4, and 19-5 and 19-6 disposed in a protecting tube 18 in a predetermined spaced relationship from each other on a same circular line around the center axis of the protecting tube 18 and extending in parallel to each other. The pairs of conductors 19-1 and 19-2, 19-3 and 19-4, and 19-5 and 19-6 are disposed in a predetermined displaced relationship from each other in the axial direction of the protecting tube 18 within a monitoring range of a refractory in which the refractory monitoring temperature sensor is incorporated. In the present refractory monitoring temperature sensor, the conductors 19-1 and 19-2 have a maximum length while the conductors 19-5 and 19-6 have a minimum length, and the conductors 19-3 and 19-4 have an intermediate length as seen in FIG. 12. An insulator or insulating substance 2 having an insulating resistance which drops as the temperature rises is filled between the conductors 19-1 to 19-6 and in the protecting tube 18 similarly as in any of the refractory monitoring temperature sensors described hereinabove.

Figure 14:
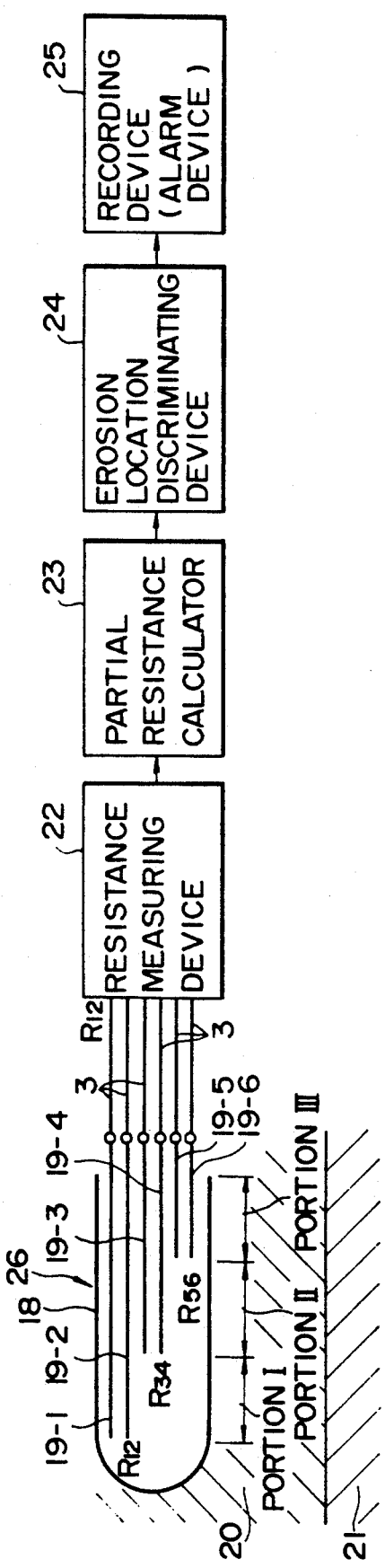
FIG. 14 is a block diagram showing an exemplary detecting circuit for use with the refractory monitoring temperature sensor shown in FIG. 12.

Such temperature sensor is, for example, embedded in a refractory 20 which contacts with hot metal 21 and connected to a predetermined detecting circuit as shown in FIG. 14 so that temperatures in a monitoring range (portions I, II and III) of the refractory 20 and a location at which a temperature rise occurs, that is, an erosion condition of the refractory 20, may be detected in accordance with resistance variations between the conductors 19-1 to 19-6 in individual pairs by the detecting circuit.

The detecting circuit includes a resistance measuring device 22, a partial resistance calculating device 23, an erosion location discriminating device 24 and a recording device (or alarming device) 25.

Here, the resistance measuring device 22 measures insulating resistances $R_{1\ 2}$, $R_{3\ 4}$ and $R_{5\ 6}$ between the conductors 19-1 to 19-6 in individual pairs by way of lead wires 3. The partial resistance calculating device 23 receives insulation resistances $R_{1\ 2}$, $R_{3\ 4}$ and $R_{5\ 6}$ from the resistance measuring device 22 and calculates partial resistances RI, RII and RIII (of the portions I, II and III) in the longitudinal direction of the sensor from the insulation resistances $R_{1\ 2}$, $R_{3\ 4}$ and $R_{5\ 6}$ by means of a calculating means which will be hereinafter described. The erosion location discriminating device 24 receives insulating resistances $R_{1\ 2}$, $R_{3\ 4}$ and $R_{5\ 6}$ and partial resistances RI, RII and RIII from the resistance measuring device 22 and the partial resistance calculating device 23 and discriminates, from the resistances $R_{1\ 2}$, $R_{3\ 4}$ and $R_{5\ 6}$ and RI, RII and RIII, an amount of wear of the refractory 20 and a location at which such wear occurs. Further, the recording device (alarming device) 25 receives a result of discrimination from the erosion location discriminating device 24 and records the result thus received or develops an alarm in accordance with the result thus received.

The temperature sensor generally denoted at 26 in FIG. 14 and the detecting circuit connected to the temperature sensor 26 operate in the following manner.

The insulation resistance $R_{1\ 2}$ between the conductors 19-1 and 19-2, the insulation resistance $R_{3\ 4}$ between the conductors 19-3 and 19-4 and the insulation resistance $R_{5\ 6}$ between the conductors 19-5 and 19-6 are continuously measured by the resistance measuring device 22. At an initial stage after the temperature sensor 26 has been installed in the refractory 20, the refractory 26 is not yet eroded and still has such a sufficient thickness that the temperature at a location at which the sensor 26 is installed remains low, and accordingly, the insulation resistances $R_{1\ 2}$, $R_{3\ 4}$ and $R_{5\ 6}$ measured by the resistance measuring device 22 exhibit infinite values.

In this condition, if an abnormal erosion occurs in the portion I of the refractory 20 shown in FIG. 14, then the temperature around the sensor portions in the portion I, that is, the conductors 19-1 and 19-2, rises significantly. Consequently, the insulation resistances $R_{1\ 2}$, $R_{3\ 4}$ and $R_{5\ 6}$ present such variations as shown in FIG. 15a. Accordingly, if an erosion of the refractory 20 occurs only at the portion I, then only the insulation resistance $R_{1\ 2}$ drops, and it can be discriminated that an erosion is proceeding at the portion I.

Figure 15C:
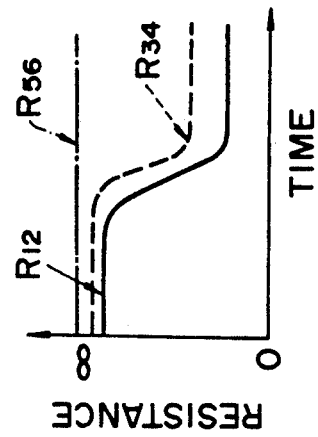
FIGS. 15a, 15b and 15c are graphs illustrating operation of the refractory monitoring temperature sensor shown in FIG. 12.
Figure 15B:
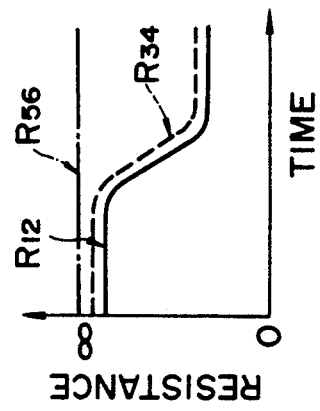
Figure 15A:
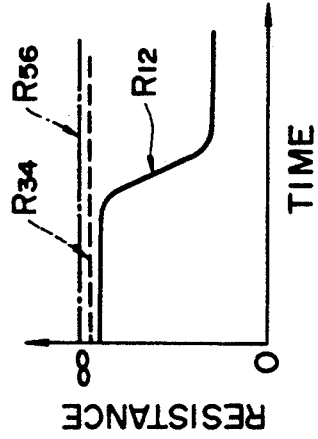

Meanwhile, variations of the insulation resistances $R_{1\ 2}$, $R_{3\ 4}$ and $R_{5\ 6}$ when an abnormal erosion occurs in the portion II and when an abnormal erosion occurs in both of the portions I and II are shown in FIGS. 15b and 15c, respectively. In those instances, since both of the insulation resistances $R_{1\ 2}$ and $R_{3\ 4}$ drop as seen in FIGS. 15b and 15c, it cannot be discriminated whether an abnormal erosion occurs only in the portion II or in both of the portions I and II.

Thus, in order to enable discrimination between those cases, the line insulation resistances (hereinafter referred to as partial resistances) RI, RII and RIII in the individual sections I, II and III are calculated by the partial resistance calculating device 23. The insulation resistances $R_{1\ 2}$, $R_{3\ 4}$ and $R_{5\ 6}$ which can be measured by means of the resistance measuring device 22 can be represented, where the partial resistances RI, RII and RIII are used, in such a manner as shown in FIGS. 16a, 16b and 16c. In particular, the resistance $R_{1\ 2}$ is equivalent to a parallel circuit of the resistors RI, RII and RIII; the resistance $R_{3\ 4}$ is equivalent to a parallel circuit of the resistors RII and RIII; and the resistance $R_{5\ 6}$ is equivalent to a circuit consisting of the single resistor RIII. Accordingly, the partial resistances RI, RII and RIII are calculated by solving equations indicated in FIGS. 16a, 16b and 16c, respectively. In short, RI=$R_1$ $_2 \cdot R_3$ $_4/(R_3$ $_4-R_1$ $_2)$, RII=$R_3$ $_4 \cdot R_5$ $_6/(R_5$ $_6-R_3$ $_4)$, and RIII=$R_5$ $_6$. Those calculations are carried out by the partial resistance calculating device 23 to find out the partial resistances RI, RII and RIII.

Variations of the partial resistances RI, RII and RIII are shown in FIGS. 17a, 17b and 17c in a corresponding relationship to FIGS. 15a, 15b and 15c, respectively. In particular, FIG. 17a shows such variations when an abnormal erosion occurs only in the portion I, and in this instance, only the partial resistance RI drops. Meanwhile, FIG. 17b shows such variations when an abnormal erosion occurs only in the portion II, and in this instance, only the partial resistance RII drops. Further, FIG. 17c shows the variations when an abnormal erosion occurs in both of the portions I and II, and in this instance, both of the partial resistances RI and RII drop.

In this manner, erosion conditions which cannot be discriminated only from the insulation resistances $R_{1\,2}$, $R_{3\,4}$ and $R_{5\,6}$ as seen from FIGS. 15a to 15c can be discriminated distinctly in accordance with the partial resistances RI, RII and RIII as seen from FIGS. 17a to 17c. Such discrimination is executed by the erosion location discriminating device 24.

Meanwhile, resistance values of the partial resistors RI, RII and RIII naturally represent degrees of erosion at the individual portions I, II and III. In particular, as apparently seen also from FIG. 2, where the resistance values are high, it can be determined that the temperatures are low and the amount of erosion is small, but on the contrary where the resistance values are low, it can be determined that the temperatures are high and an erosion is proceeding. Such determination is executed by the erosion location discriminating device 24, and also a degree of such erosion is discriminated by the erosion location discriminating device 24.

Figure 18:
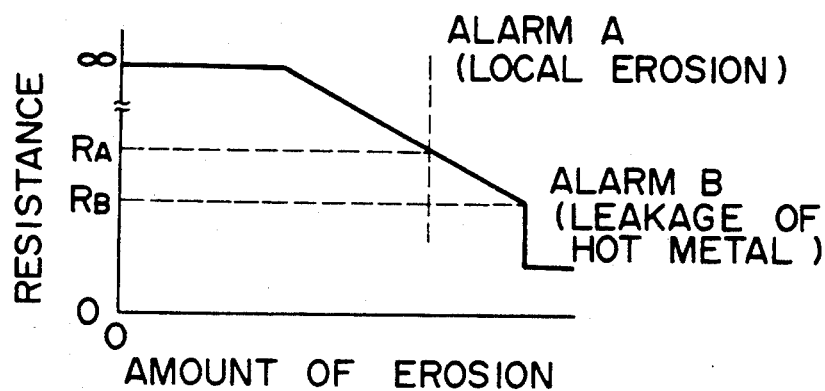
FIG. 18 is a graph illustrating an alarming operation criterion in the refractory monitoring temperature sensor shown in FIG. 12.

Then, in the present refractory monitoring temperature sensor described above, the recording device (or alarming device) 25 is caused to operate in accordance with a result of discrimination of a degree of erosion by the erosion location discriminating device 24. The operation criterion then is such that, when a measured resistance value drops to $R_A$ as seen in FIG. 18, the recording device (alarming device) 25 produces an alarm signal A indicative of a local erosion, but when the resistance value drops further to $R_B$ lower than $R_A$, the recording device (or alarming device) 25 produces another alarm signal B indicative of leakage of hot metal to inform an operator or the like of the situation.

Figure 19:
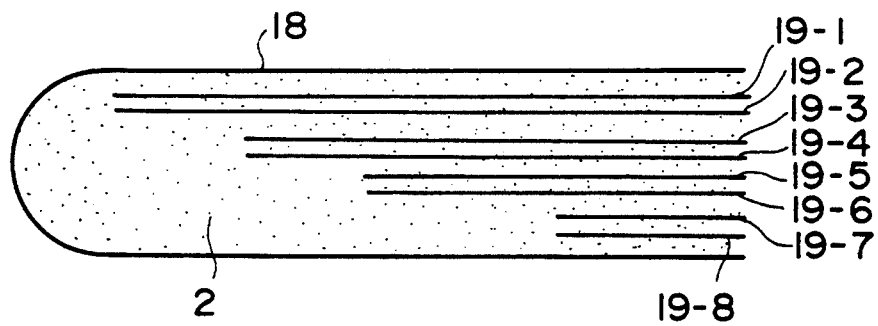
FIG. 19 is a longitudinal sectional view showing a modification to the refractory monitoring temperature sensor shown in FIG. 12.
Figure 20:
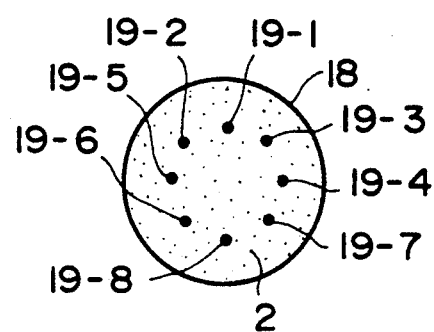
FIG. 20 is a transverse sectional view of the modified refractory monitoring temperature sensor shown in FIG. 19.
Figure 21:
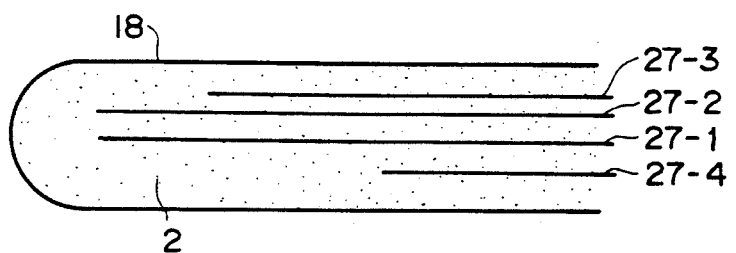
FIG. 21 is a longitudinal sectional view showing another modification to the refractory monitoring temperature sensor shown in FIG. 12.
Figure 22:
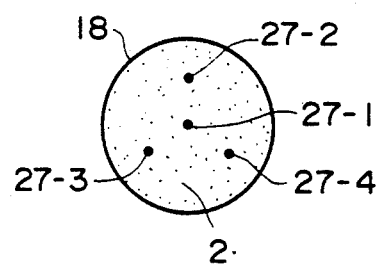
FIG. 22 is a transverse sectional view of the modified refractory monitoring temperature sensor shown in FIG. 21.
Figure 23:
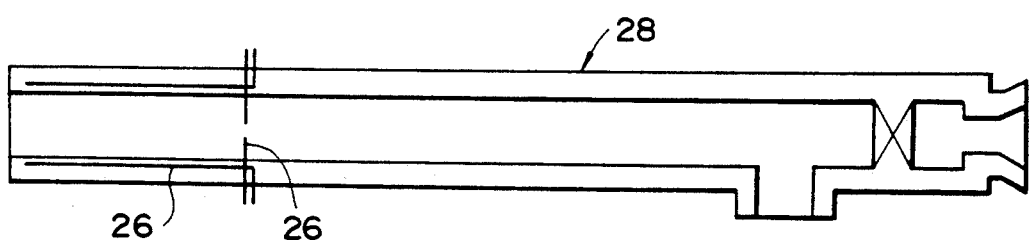
FIG. 23 is a schematic plan view of a hot metal trough to which the refractory monitoring temperature sensor shown in FIGS. 12, 19 or 21 is applied.
Figure 24:
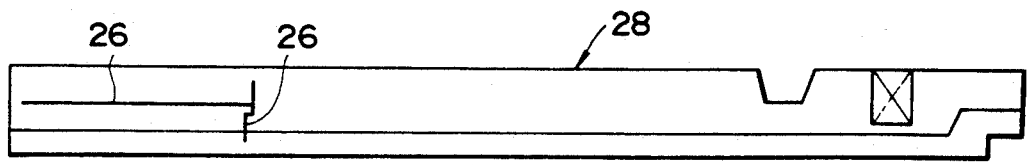
FIG. 24 is a schematic longitudinal sectional view of the hot metal trough shown in FIG. 23.

It is to be noted that, while the temperature sensor 26 described above includes three pairs of conductors, it may otherwise include four pairs of conductors 19-1 to 19-8 as shown in FIGS. 19 and 20 or else include two pairs or five or more pairs of conductors. Meanwhile, where three pairs of conductors are involved, they may be constituted from a total of four conductors wherein one of them serves as a counterpart for each of the other conductors for individual conductor pairs in such a manner as shown in FIGS. 21 and 22. In particular, referring to FIGS. 21 and 22, a conductor 27-1 is disposed at the center axis of a protecting tube 18 while three conductors 27-2, 27-3 and 27-4 are disposed on a same circular line around the conductor 27-1 as shown in FIG. 22. The conductors 27-1 and 27-2 have a same length, and the conductor 27-4 has a minimum length while the conductor 27-3 has an intermediate length. Then, the conductor 27-1 is used commonly for the measurement of insulation resistances such that an insulation resistance between the conductors 27-1 and 27-2, another insulation resistance between the conductors 27-1 and 27-3 and a further insulation resistance between the conductors 27-1 and 27-4 may be measured.

Figure 25:
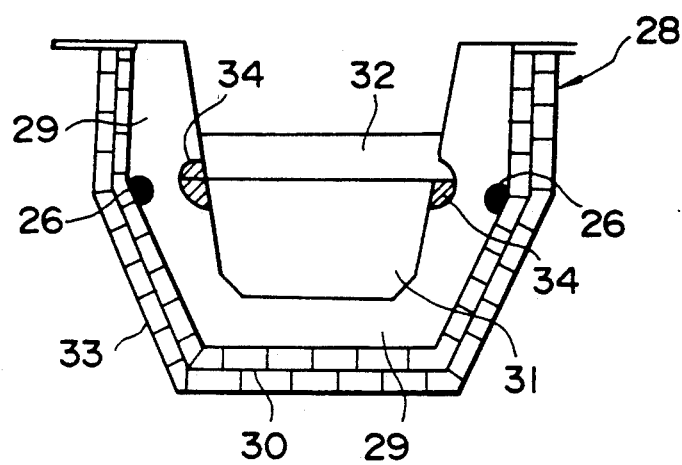
FIGS. 25 and 26 are different partial transverse sectional views of the hot metal trough shown in FIG. 23.
Figure 26:
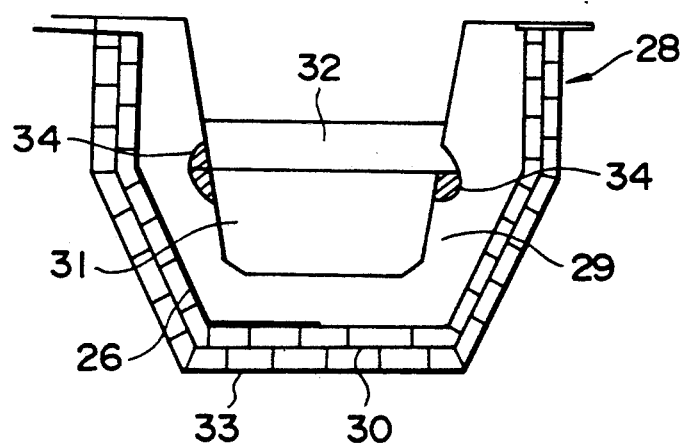
Figure 27:
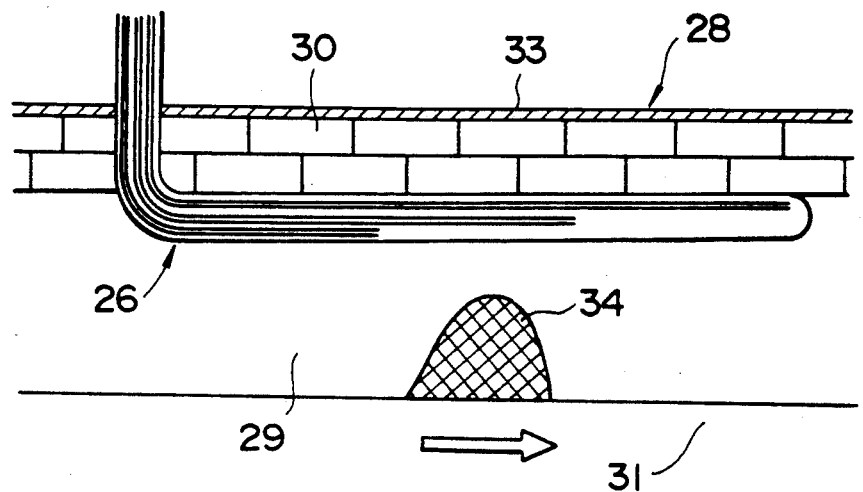
FIG. 27 is an enlarged partial sectional view of the hot metal trough shown in FIG. 23.
Figure 28:
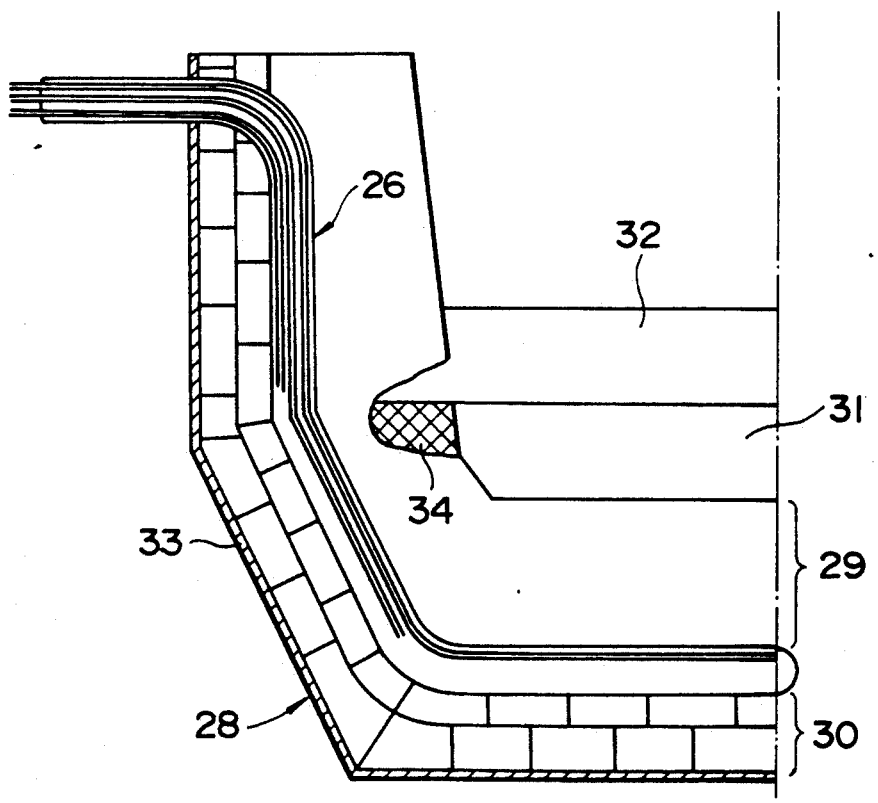
FIG. 28 is a further enlarged partial transverse sectional view of the hot metal trough shown in FIG. 23.

Further, the temperature sensor 26 described above can be applied to an actual hot metal trough as shown in FIGS. 23 to 28. Referring to FIGS. 23 to 28, the hot metal trough is generally denoted at 28 and includes a monolithic refractory 29, a fixed shape refractory 30 provided on the monolithic refractory 29, and a shell 33 provided on an outer periphery of the fixed shape refractory 30. Hot metal 31 flows in a recess of the monolithic refractory 29 of the hot metal trough 28, and slag 32 is formed on an outer surface of the hot metal 31. Thus, an eroded portion 34 may be formed on the monolithic refractory 29 of the hot metal trough 28. Then, a pair of temperature sensors 26 are embedded in two different directions between the monolithic refractory 29 and the fixed shape refractory 30 of the hot metal trough 28 such that one of them extends in a longitudinal direction of a side wall of the hot metal trough 28 as shown in FIGS. 25 and 27 while the other temperature sensor 26 extends in a widthwise direction of the bottom of the hot metal trough 28 as shown in FIGS. 26 and 28.

With the construction described above, if an eroded portion 34 occurs in the monolithic refractory 29 as shown in FIGS. 25 to 28, then an amount and a location of such erosion can be detected by an action of the temperature sensor 26 and the detecting circuit described above. Accordingly, where the temperature sensor 26 shown in FIG. 12 or any modification to the same is applied to the hot metal trough 28 in this manner, an erosion by the hot metal 31 or slag 32 can be detected with certainty and the possibility of leakage of hot metal can be eliminated. Besides, a timing for the repair or replacement of the refractories 29 and 30 can be determined, and the temperature sensor 26 can be used for any cycle each time the refractories 29 and 30 are repaired or replaced.

As described above, with the temperature sensor shown in FIG. 12 or any modification to the same, similar effects to those of the temperature sensor shown in FIG. 1 can be achieved. Besides, not only a temperature within a monitoring range of a refractory of the hot metal trough 28 or the like but also a location at which a temperature rise occurs, that is, an amount or a location of erosion of the refractory, can be specified, and consequently, an erosion condition over a wide range can be monitored. Further, upon repair of the refractory, where the temperature sensor is employed, a repair material or a repairing means can be selected arbitrarily in accordance with a thickness of a remaining portion of any location, and accordingly, the temperature sensor can contribute also to reduction in amount of such repair material.

Figure 29:
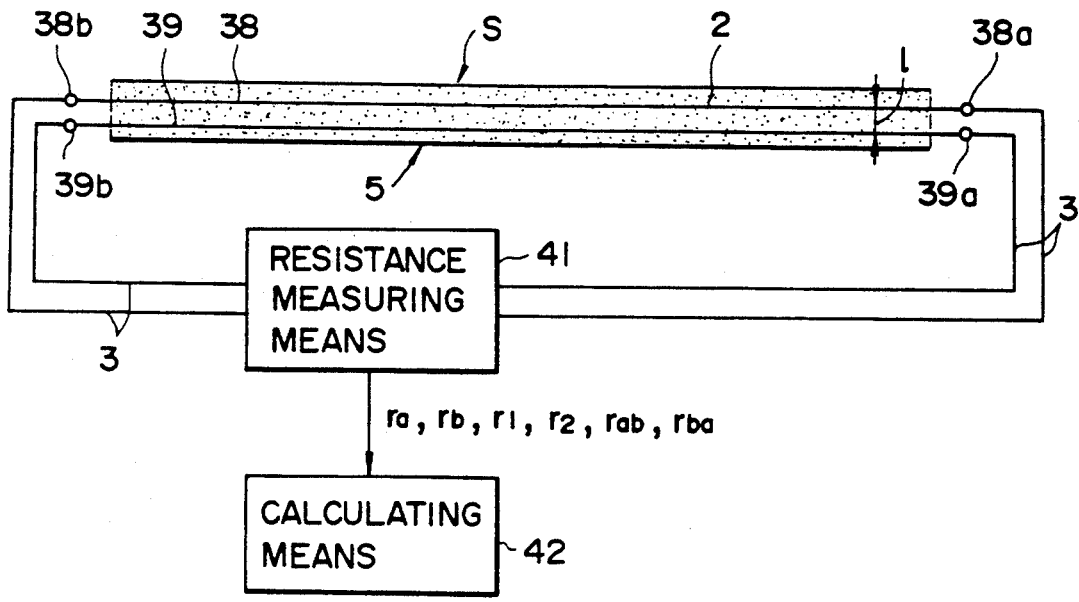
FIG. 29 is a diagrammatic representation showing general construction of a refractory erosion location measuring device to which the present invention is applied.

Referring now to FIG. 29, there is shown a refractory erosion location measuring device to which the present invention is applied. The refractory erosion location measuring device shown includes a sensor S including a pair of metal wires 38 and 39 serving as metal members and made of a metal having a high melting point such as, for example, kanthal, chromel or inconel. The metal wires 38 and 39 extend in parallel to each other in a longitudinal direction of the sensor S and are disposed in an opposing spaced relationship by a distance 1 from each other. The metal wires 38 and 39 are accommodated in a protecting tube 5 made of, for example, SUS, inconel or kanthal, and an insulator or insulating refractory 2 is filled between the metal wires 38 and 39 and in the protecting tube 5. The sensor S constituted from those elements is provided in a monitoring range of a refractory.

Figure 30:
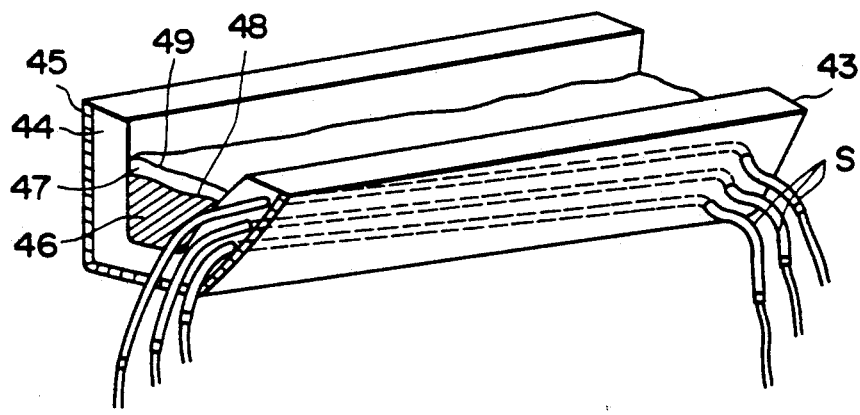
FIG. 30 is a perspective view illustrating an exemplary application of the refractory erosion location measuring device shown in FIG. 29.

In particular, the sensor S is used, for example, for such a hot metal trough 43 as shown in FIG. 30. Referring to FIG. 30, the hot metal trough 43 includes a lining refractory 44 and a shell 45, and hot metal 46 flows in a recess of the hot metal trough 43, and slag 47 is formed on a surface of the hot metal 46. A plurality of (three in FIG. 30) such sensors S are embedded in a side wall of the lining refractory 44 and extend in a longitudinal direction of the hot metal trough 43. The sensors S thus monitor an erosion condition of a portion of the lining refractory 44 from a slag line 49 of the slag 47 to a location near a metal line 48 of the hot metal 46 at which a local abnormal erosion likely occurs.

Figure 31:
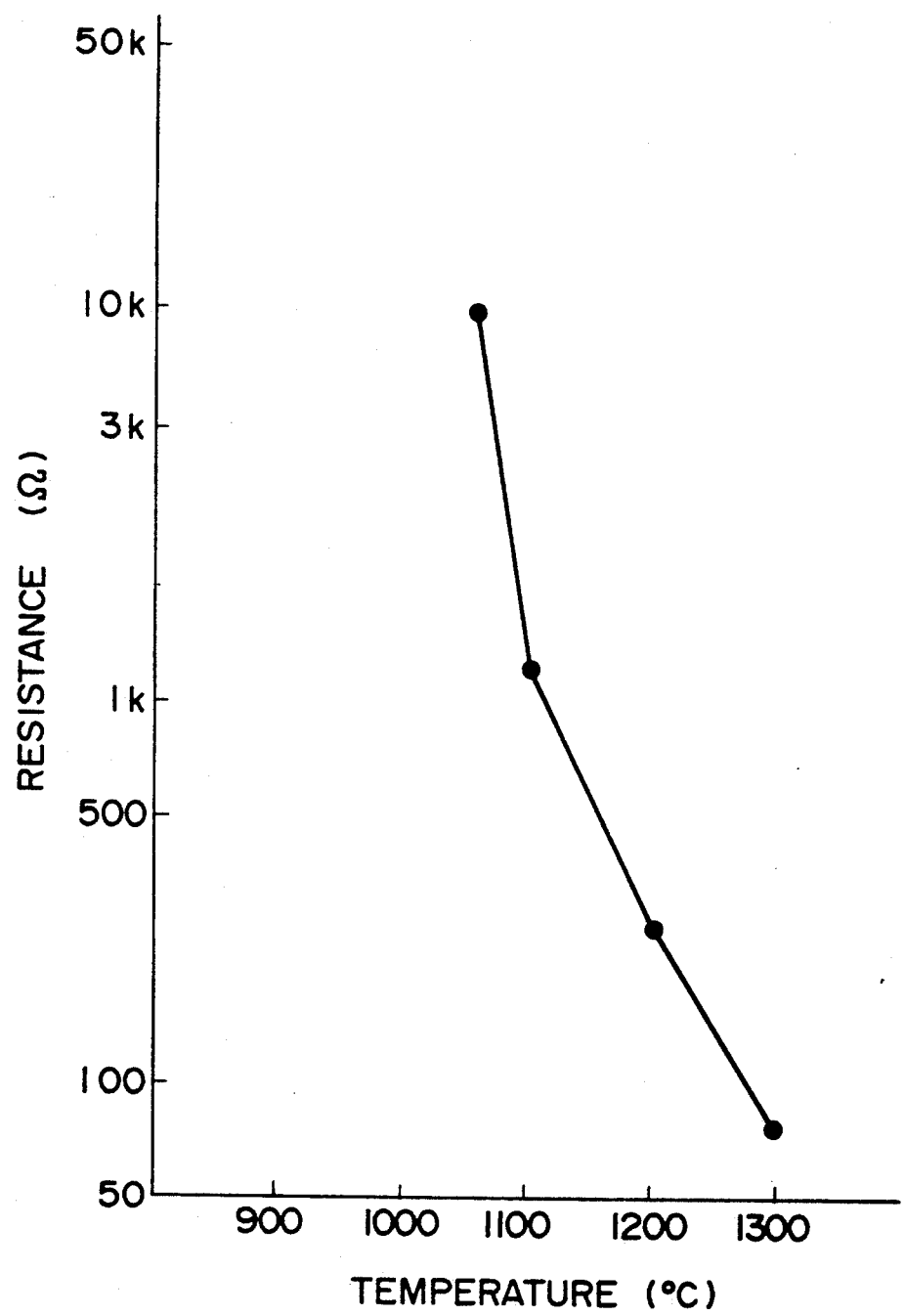
FIG. 31 is a graph illustrating a characteristic of an insulator of the refractory erosion location measuring device shown in FIG. 29.
Figure 32:
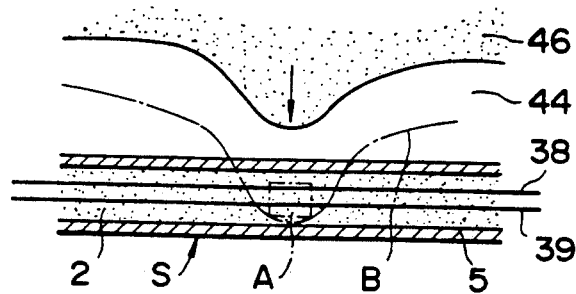
FIG. 32 is a schematic partial sectional view illustrating operation of the refractory erosion location measuring device shown in FIG. 29.

Referring back to FIG. 29, the insulator 2 which is a component of the sensor S is formed from a substance which has an insulation resistance which decreases (a shunt resistance occurs) as the temperature rises as seen in FIG. 31 and which always exhibits a same characteristic even if it repetitively undergoes a temperature variation between high and low temperatures. Such insulator 2 may be, for example, magnesium oxide (MgO) or alumina of a high purity (99.8% in purity) which is particularly effective in a high temperature region (1,300° C.). It is to be noted that FIG. 31 shows a result of an experiment which was conducted using a sensor which has an outer diameter of 3.0 mm and wherein the metal wires have a diameter of 0.5 mm and magnesium oxide (MgO) is used as the insulator and using an electric furnace having a soaking of up to 300 mm. As apparently seen from FIG. 31, in the case of MgO, when the temperature rises higher than 1,000° C., a decrease in insulation resistance occurs in a logarithmic scale.

Referring back to FIG. 29, the metal wires 38 and 39 are individually connected at the opposite ends 38a, 38b and 39a, 39b thereof to lead wires 3 so that a resistance between the metal wires 38 and 39 in pair may be detected by a resistance measuring means 41 by way of the lead wires 3.

The resistance measuring means 41 measures a resistance between two arbitrary ones of the ends 38a, 38b and 39a, 39b of the metal wires 38 and 39 of the sensor S. In particular, the resistance measuring means 41 can measure six different resistance values including a resistance value ra between the ends 38a and 39a, a resistance value rb between the ends 38b and 39b, a resistance value $r_1$ between the ends 38a and 38b of the metal wire 38, a resistance value $r_2$ between the ends 39a and 39b of the metal wire 39, a resistance value rab between the ends 38a and 39b, and a resistance value rba between the ends 38b and 39a.

A calculating means 42 is connected to the resistance measuring means 41 for receiving a result of measurement (six resistance values) from the resistance measuring means 41 and calculating an amount and a location of erosion of the lining refractory 44 of the hot metal trough 43 from the result of measurement thus received in accordance with a procedure which will be hereinafter described.

With the refractory erosion location measuring device having such construction as described above, if a local erosion proceeds at a certain location of the refractory 44 of the hot metal trough 43, then an isothermal line B of a high temperature region may reach a position near the sensor S at the location. As a result, at a high temperature portion A of the sensor S, the insulation resistance of the insulator 2 decreases from the infinite as seen from FIG. 31 so that a conducting condition may be entered and a shunt resistance will appear between the high melting point metal wires 38 and 39. Since such shunt resistance has such a predetermined relationship to the temperature, that is, to an amount of erosion as seen in FIG. 31, if a value R of the shunt resistance is measured, then it is possible to esteem a degree of the local abnormal erosion.

Subsequently, the procedure of calculating such shunt resistance value R and a location of a local erosion which is executed by the calculating means 42 shown in FIG. 29 will be described with reference to FIG. 33. It is to be noted that, in FIG. 33, reference character L denotes an overall length of the sensor S, la a distance from the end 38a or 39a of the metal wire 38 or 39 to a location C at which a shunt resistance appears, lb a distance from the other end 38b or 39b to the location C, $R_1$ a a resistance value of a portion of the metal wire 38 from the end 38a to the location C, $R_1$ b a resistance value of the other portion of the metal wire 38 from the other end 38b to the location C, $R_2$ a a resistance value of a portion of the metal wire 39 from the end 39b to the location C, and $R_2$ b a resistance value from the other end 39b to the location C.

Figure 33:
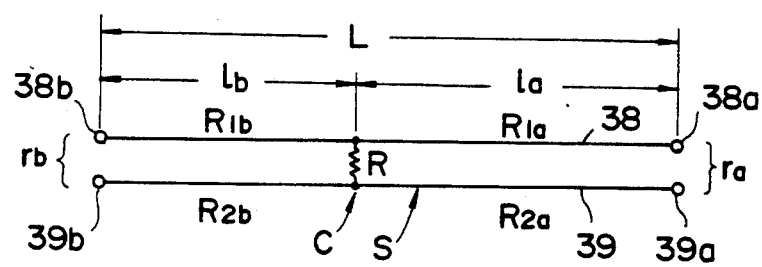
FIG. 33 is an equivalent circuit diagram illustrating a calculating procedure by a calculating means of the refractory erosion location measuring device shown in FIG. 29.
Figure 34:
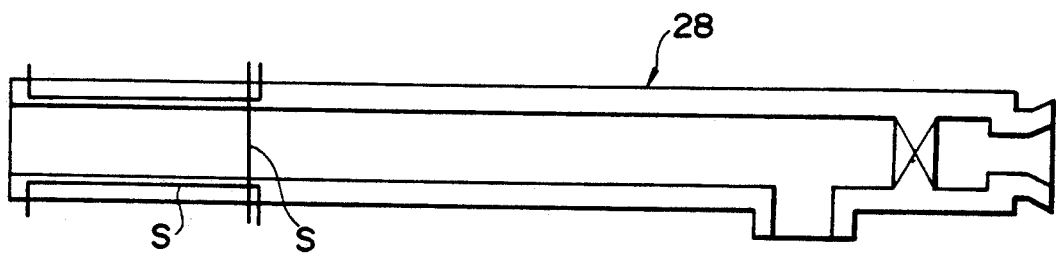
FIG. 34 is a schematic plan view of a hot metal trough in which the refractory erosion location measuring device shown in FIG. 29 is incorporated.
Figure 35:
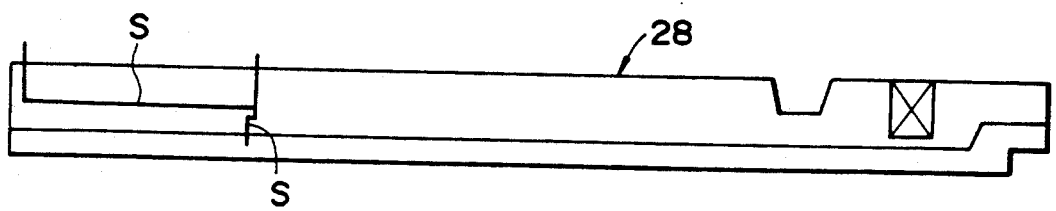
FIG. 35 is a schematic longitudinal sectional view of the hot metal trough shown in FIG. 34.

Here, the six resistance values ra, rb, $r_1$, $r_2$, rab and rba which are measured by the resistance measuring means 41 have the following relationship to the five resistance values $R_1$ a, $R_1$ b, $R_2$ a, $R_2$ b and R illustrated in FIG. 33.

$$ra = R_1 a + R + R_2 a \quad (1)$$
$$rb = R_1 b + R + R_2 b$$
$$r_1 = R_1 a + R_1 b$$
$$r_2 = R_2 a + R_2 b$$
$$rab = R_1 a + R + R_2 b$$
$$rba = R_1 b + R + R_2 a$$

Meanwhile, from the dimensions of the sensor S, the following relationships stand:

$$L = la + lb \quad (2)$$

$$\frac{lb}{la} = \frac{R_1 b}{R_1 a} = \frac{R_2 b}{R_2 a} \quad (3)$$

From the expressions (1) to (3) above, the shunt resistance value R corresponding to an amount of erosion and a value la/L corresponding to a location at which the erosion occurs are calculated in accordance with the following expressions (4) and (5):

$$\frac{la}{L} = \frac{(ra - rb) + (rab - rba) + 2r_1}{4r_1} \quad (4)$$

$$= \frac{(ra - rb) - (rab - rba) + 2r_2}{4r_2}$$

$$R = \frac{(ra + rb) - (r_1 + r_2)}{2} \quad (5)$$

$$= \frac{(rab + rba) - (r_1 + r_2)}{2}$$

In those expressions, the resistance values ra, rb, $r_1$, $r_2$, rab and rba from the resistance measuring means 41 and the overall length L of the sensor S are known values.

In short, from a result of measurement of resistance values of arbitrary ones of the ends 38a, 38b and 39a, 39b of the metal wires 38 and 39 by the resistance measuring means 41, the calculating means 42 can calculate a shunt resistance value corresponding to an amount of erosion in accordance with the expression (5) above and also can calculate a location la/L of a local erosion corresponding to the location at which the shunt resistance appears in accordance with the expression (4) above.

In this instance, the shunt resistance value R does not depend upon the resistances of the high melting point metal wires 38 and 39 as apparently seen from the expression (5) above and consequently, can be extracted as a shunt resistance which appears purely between the metal wires 38 and 39 or as a function which depends upon a temperature without taking a temperature dependency of the resistances of the high melting point metal wires 38 and 39. A degree of an amount of erosion can be esteemed by comparing such pure shunt resistance value R with several different threshold values. Since the shunt resistance value R decreases in a logarithmic scale in response to a temperature as shown in FIG. 31, monitoring of erosion can be achieved with a significantly high degree of accuracy.

It is to be noted that, when it is intended to apply the sensor S to a main trough of a blast furnace, taking a durability into consideration where the sensor S is repetitively used at a hot melt temperature of 1,400° to 1500° C., preferably the sensor has an outer diameter of 6 to 10 mm; the material of the protecting tube 5 is SUS310S or inconel; the insulator 2 is made of MgO; and the high melting point metal wires 38 and 39 are formed from kanthal alloy wires having a melting point of 1,500° C. or so and having a diameter of 0.5 to 1.5 mm or so. Naturally, however, materials and dimensions of various components of the sensor S may be selected suitably in accordance with an object for the monitoring.

Figure 36:
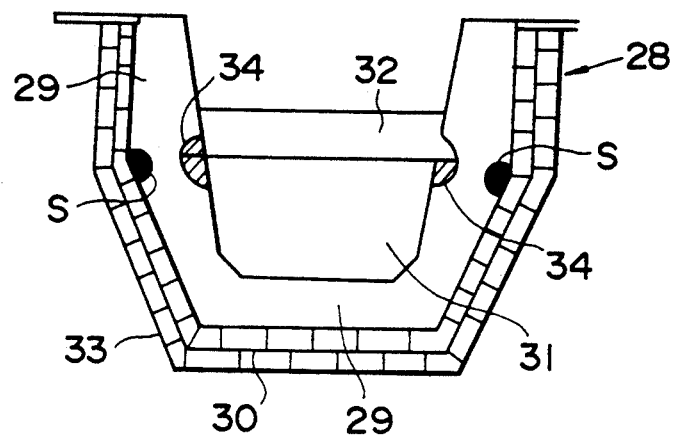
FIGS. 36 and 37 are different partial transverse sectional view of the hot metal trough shown in FIG. 34.
Figure 37:
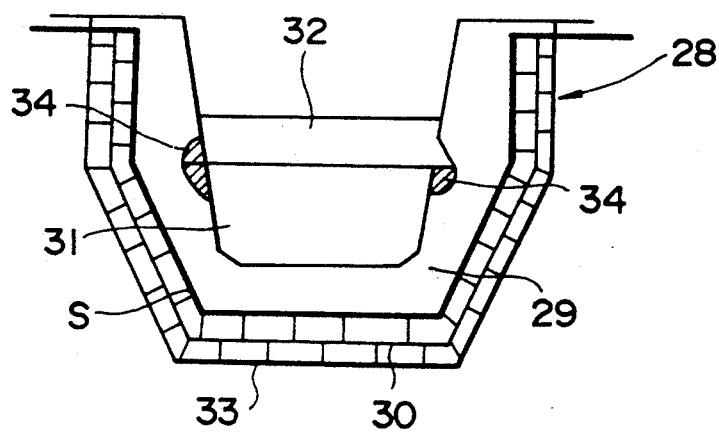
Figure 38:
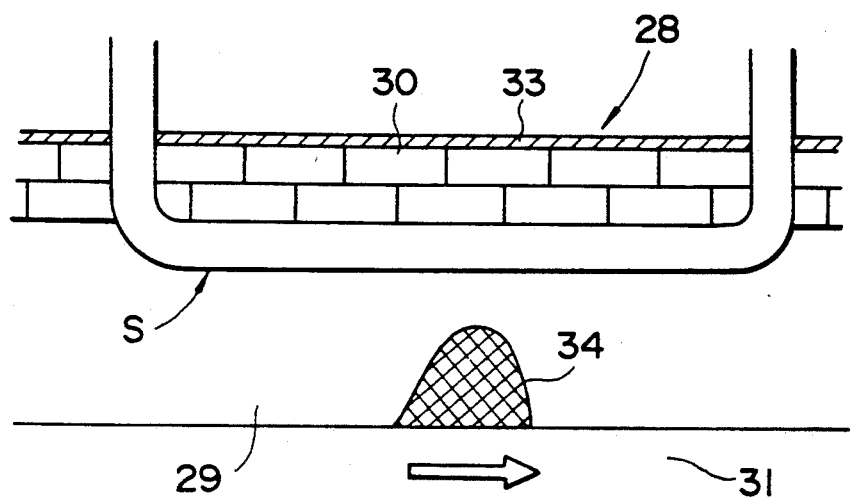
FIG. 38 is an enlarged partial sectional view of the hot metal trough shown in FIG. 34.
Figure 39:
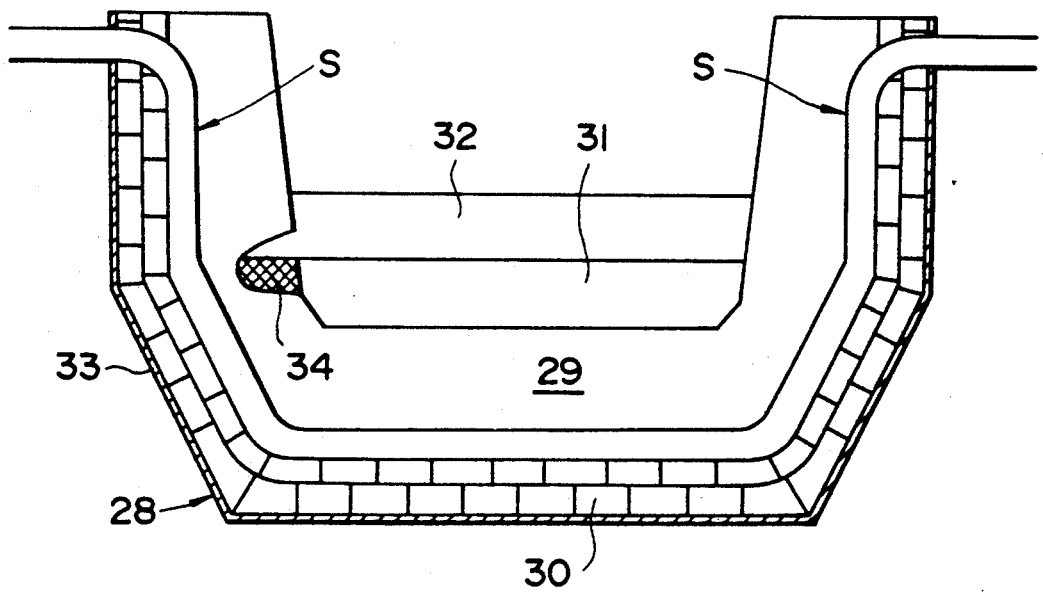
FIG. 39 is an enlarged partial transverse sectional view of the hot metal trough shown in FIG. 34.

Further, the sensor S described above can be applied to an actual hot metal trough as shown in FIGS. 34 to 39. Referring to FIGS. 34 to 39, the hot metal trough is generally denoted at 28 and has a substantially similar construction to the hot metal trough 28 shown in FIGS. 23 to 28 and described hereinabove. In particular, the hot metal trough 28 includes a monolithic refractory 29, a fixed shape refractory 30 provided on the monolithic refractory 29, and a shell 33 provided on an outer periphery of the fixed shape refractory 30. Hot metal 31 flows in a recess of the monolithic refractory 29 of the hot metal trough 28, and slag 32 is formed on an outer surface of the hot metal 31. Thus, an eroded portion 34 may be formed on the monolithic refractory 29 of the hot metal trough 28. Then, a pair of such sensors S as described above are embedded in two different directions between the monolithic refractory 29 and the fixed shape refractory 30 of the hot metal trough 28 such that one of them extends in a longitudinal direction of a side wall of the hot metal trough 28 as shown in FIGS. 36 and 38 while the other sensor S extends in a widthwise direction of the bottom of the hot metal trough 28 as shown in FIGS. 37 and 39.

In this manner, with the refractory erosion location measuring device described above, a condition of local erosion (which normally occurs in such a small area that the position thereof cannot be specified) of a refractory which is normally caused by a flow of a high temperature molten substance or by a thermal stress or the like is detected not from a melting breakdown of the sensor S itself but from a variation in insulation resistance of the insulator 2 which arises from a high temperature due to an erosion of the refractory. Accordingly, it is possible to re-use or continuously use the sensor S. Besides, the sensor S can be made compact and produced at a reduced cost while it can sense a temperature at an arbitrary position in an entire monitoring area.

Further, where the refractory erosion location measuring device is applied to a refractory of such hot melt trough 43 or 28 shown in FIG. 30 or FIGS. 34 to 39 or to some other refractory, an amount and a location of erosion can be discriminated with certainty from a result of calculation from the calculating means 41. Consequently, determination of a timing for the spraying repair or replacement of a refractory or specification of a location for such spraying repair or replacement can be effected with certainty. Besides, not only a possible serious accident arising from leakage of hot metal can be prevented, but also there is an advantage that the refractory can be repaired in a short period of time.

Figure 40:
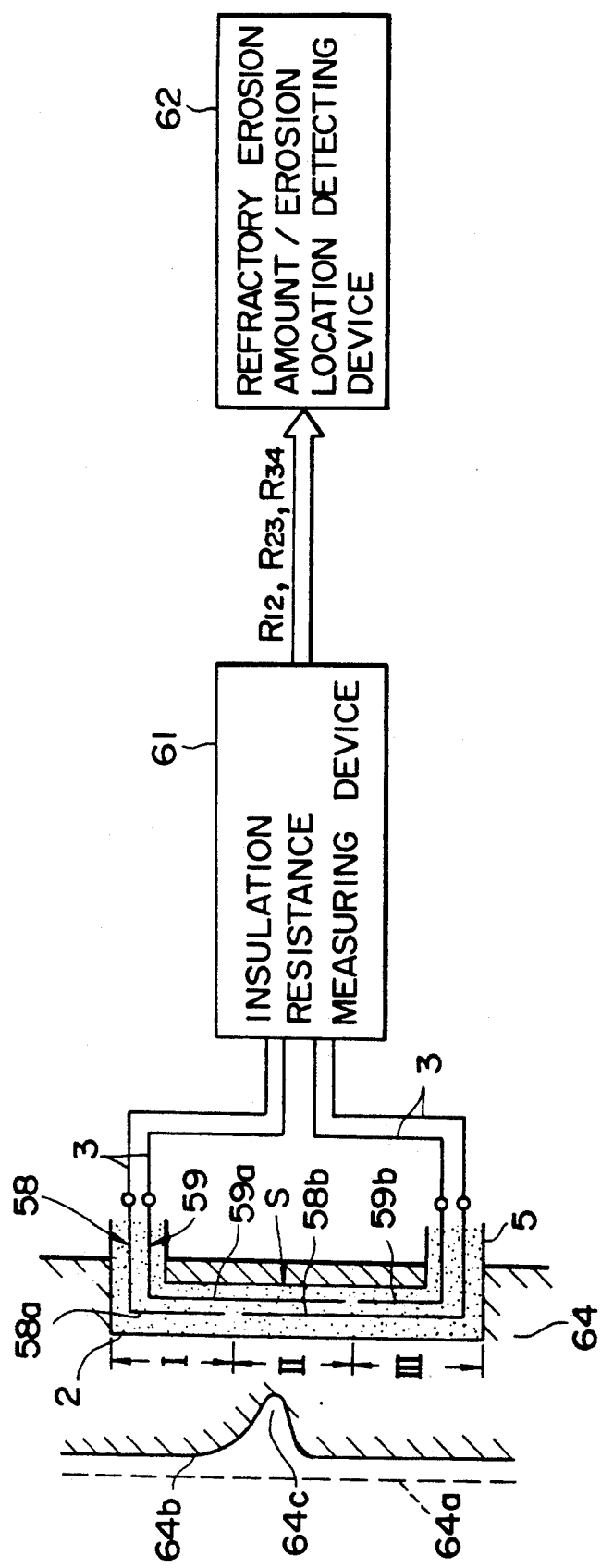
FIG. 40 is a diagrammatic representation showing general construction of another refractory erosion location measuring device to which the present invention is applied.
Figure 41:
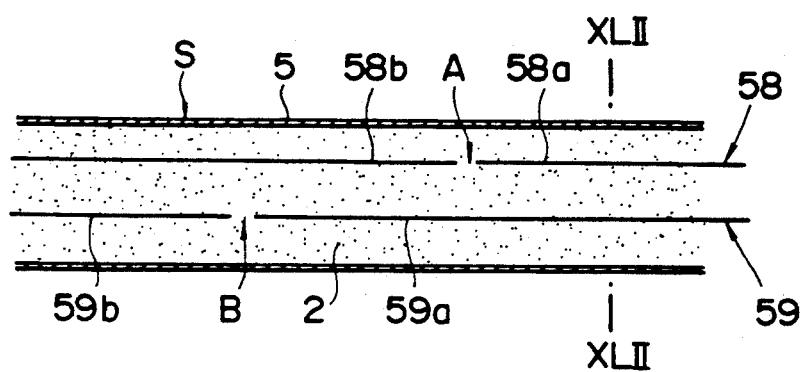
FIG. 41 is a longitudinal sectional view of a sensor of the refractory erosion location measuring device shown in FIG. 40.
Figure 42:
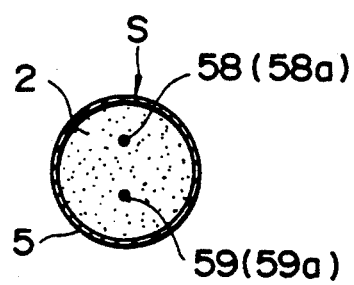
FIG. 42 is a sectional view taken along line XLII—XLII of FIG. 41.

Referring now to FIGS. 40 to 42, there is shown another refractory erosion location measuring device to which the present invention is applied. The refractory erosion location measuring device shown includes a sensor S including a pair of metal wires 58 and 59 serving as metal members and made of a metal having a high melting point such as, for example, kanthal, chromel or inconel. The metal wires 58 and 59 extend in parallel to each other in a longitudinal direction of the sensor S and are disposed in a predetermined opposing spaced relationship from each other. The metal wires 58 and 59 are cut at different locations A and B in a longitudinal direction of the sensor S such that they may be composed of a pair of metal wire sections 58a, 58b and 59a, 59b, respectively, as particularly seen in FIG. 41. The metal wires 58 and 59 are accommodated in a protecting tube 5 made of, for example, SUS, inconel or kanthal, and an insulator or insulating refractory 2 is filled between the metal wires 58 and 59 and in the protecting tube 5. The sensor S constituted from those elements is provided in a monitoring range of a refractory.

Here, the insulator 2 which is a component of the sensor S may be formed from a similar substance to that of the sensor S described hereinabove with reference to FIG. 29.

Referring to FIG. 40, the metal wire sections 58a, 58b and 59a, 59b of the metal wires 58 and 59 are individually connected at outer ends thereof to lead wires 3 so that a resistance between the metal wires 58 and 59 in pair may be detected by an insulation resistance measuring device 61 by way of the lead wires 3.

The insulation resistance measuring device 61 measures an insulation resistance between two arbitrary ones of the metal wire sections 58a, 58b and 59a, 59b of the metal wires 58 and 59 of the sensor S. In particular, the insulation resistance measuring device 61 measures three different resistance values including an insulation resistance value $R_{1\ 2}$ between the metal wire sections 58a and 59a, an insulation resistance value $R_{2\ 3}$ between the metal wire sections 58b and 59a and an insulation resistance value $R_{3\ 4}$ between the metal wire sections 58b and 59b.

A refractory erosion amount/erosion location detecting device (discriminating means) 62 is connected to the insulation resistance measuring device 61 for receiving a result of measurement (three resistance values) from the insulation resistance measuring device 61 and discriminating an amount and a location of erosion of a lining refractory 64 from the result of measurement thus received in accordance with a procedure which will be hereinafter described. In the arrangement shown in FIG. 40, a location of an erosion is determined such that the erosion occurs in any one of such three regions I, II and III as seen in FIG. 40. Here, the region I is defined as a region in which the metal wire sections 58a and 59a are opposed to each other; the region II as a region in which the metal wire sections 58b and 59a are opposed to each other; and the region III as a region in which the metal wire sections 58b and 59b are opposed to each other.

It is to be noted that, in FIG. 40, reference character 64a denotes an initial refractory face of the refractory 64, 64b an actual working face of the refractory 64, and 64c an eroded portion of the refractory 64.

With the refractory erosion location measuring device having such construction as described above, at an initial stage after the sensor S has been installed in the refractory 64, the refractory 64 is not yet eroded and still has a sufficient thickness (refer to the initial refractory face 64a). Consequently, the temperature of the sensor S remains low, and the insulation resistance values $R_{1\,2}$, $R_{2\,3}$ and $R_{3\,4}$ all exhibit infinite values. However, if it is assumed that a local abnormal erosion occurs in the refractory 64 and an eroded portion 64c appears within the range of the region II as shown in FIG. 40, then a location of the sensor S around the region II is put into a high temperature condition. As a result, the insulation resistance of the insulator 2 decreases from the infinite as seen from FIG. 31 so that a conducting condition may be entered and a shunt resistance will appear between the metal wire sections 58b and 59a of the metal wires 58 and 59 as seen in FIG. 43b so that the insulation resistance value $R_{2\,3}$ between them will decrease. In this instance, the other insulation resistance values $R_{1\,2}$ and $R_{3\,4}$ for the regions I and III do not drop.

Figure 43A:
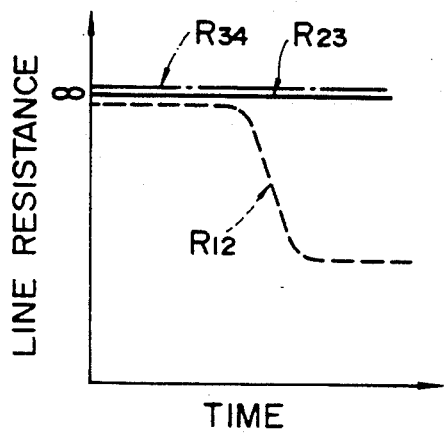
FIGS. 43a, 43b, 43c and 43d are graphs illustrating characteristics of an insulator of the sensor shown in FIG. 41.
Figure 43B:
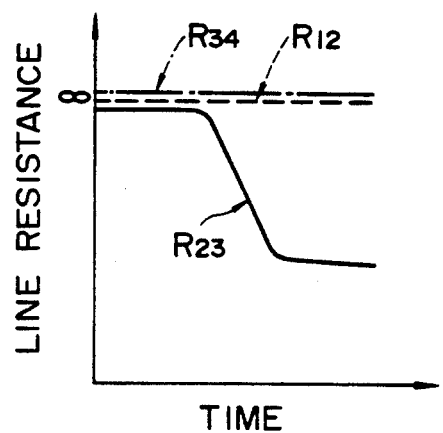
Figure 43C:
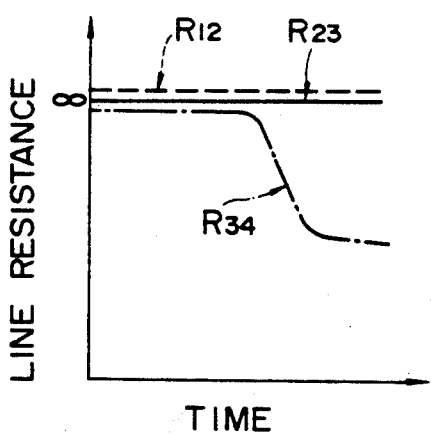
Figure 43D:
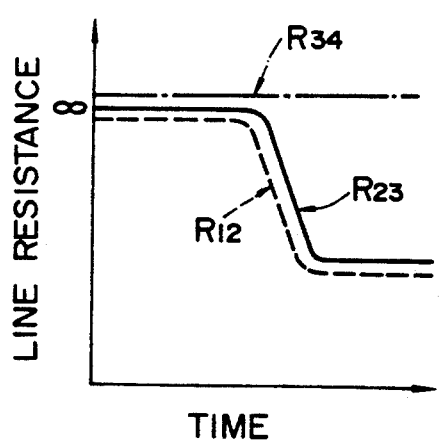

Similarly, in case a local erosion occurs in the region I, only the insulation resistance value $R_{1\,2}$ between the metal wire sections 58a and 59a in the region I decreases as seen in FIG. 43a, but otherwise if a local erosion occurs in the region III, then only the insulation resistance value $R_{3\,4}$ between the metal wire sections 58b and 59b in the region III drops as seen in FIG. 43c. On the other hand, if an abnormal erosion occurs both in the regions I and II, then the insulation resistance values $R_{1\,2}$ and $R_{2\,3}$ in the regions I and II drop simultaneously as seen in FIG. 43d.

Accordingly, the refractory erosion amount/erosion location detecting device 62 can detect in which one of the regions I, II and III an erosion occurs and specify a location of the abnormal erosion by receiving insulation resistance values $R_{1\,2}$, $R_{2\,3}$ and $R_{3\,4}$ from the insulation resistance measuring device 61 and discriminating which one or ones of the insulation resistance values $R_{1\,2}$, $R_{2\,3}$ and $R_{3\,4}$ have dropped.

Meanwhile, since the insulation resistances $R_{1\,2}$, $R_{2\,3}$ and $R_{3\,4}$ (shunt resistances) have a predetermined relationship to a temperature, that is, to an amount of erosion of the refractory 64 as seen from FIG. 31, the detecting device 62 can esteem and detect a degree of the local abnormal erosion from such resistance values. In particular, if the amount of erosion is large, then the temperature at the sensor S is high, and accordingly, the resistance value of the sensor S drops significantly. Since the resistance value decreases in a log scale in response to the temperature as seen in FIG. 31, monitoring of erosion can be achieved with a significantly high degree of accuracy.

Figure 44:
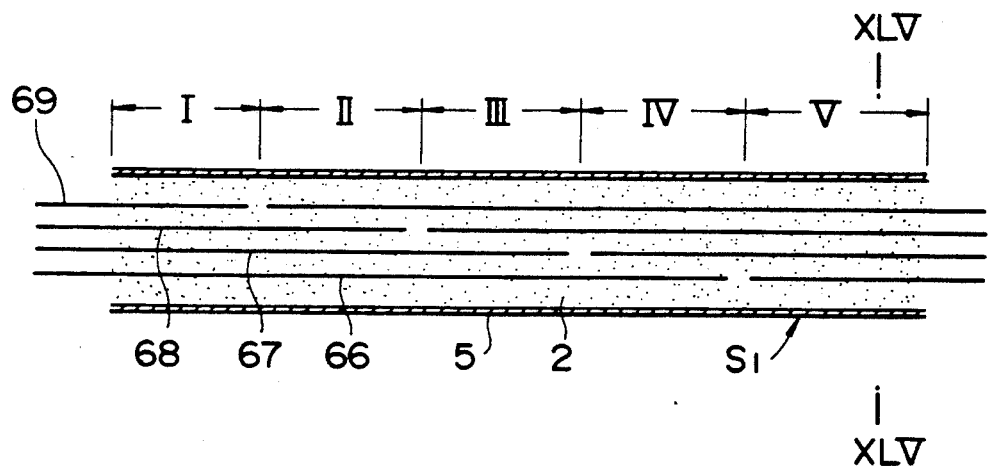
FIG. 44 is a longitudinal sectional view showing a modification to the sensor shown in FIGS. 41.
Figure 45:
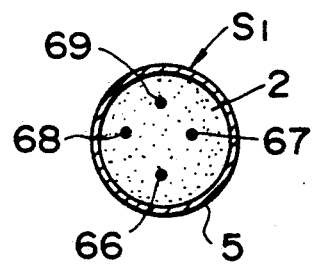
FIG. 45 is a sectional view taken along line XLV—XLV of FIG. 44.

It is to be noted that, while the sensor S of the construction described above includes two high melting point metal wires 58 and 59 which are each cut into two metal wire sections, the sensor S need not have such specific construction and may otherwise include three or more such metal wires. FIGS. 44 and 45 show an exemplary one of such modified sensors. The modified sensor generally denoted at $S_1$ includes four metal wires 66, 67, 68 and 69 disposed in a protecting tube 5. The metal wires 66 to 69 are cut at different locations in a longitudinal direction of the sensor $S_1$ as seen in FIG. 44. With the modified sensor $S_1$, it is possible to specify in which one or ones of five regions I, II, III, IV and V shown in FIG. 44 an erosion occurs.

Similarly to the sensor S shown in FIG. 29, the sensor S shown in FIGS. 40 to 42 or the sensor $S_1$ shown in FIGS. 44 and 45 can be applied to such hot metal trough 28 as shown in FIGS. 34 to 39.

Figure 46:
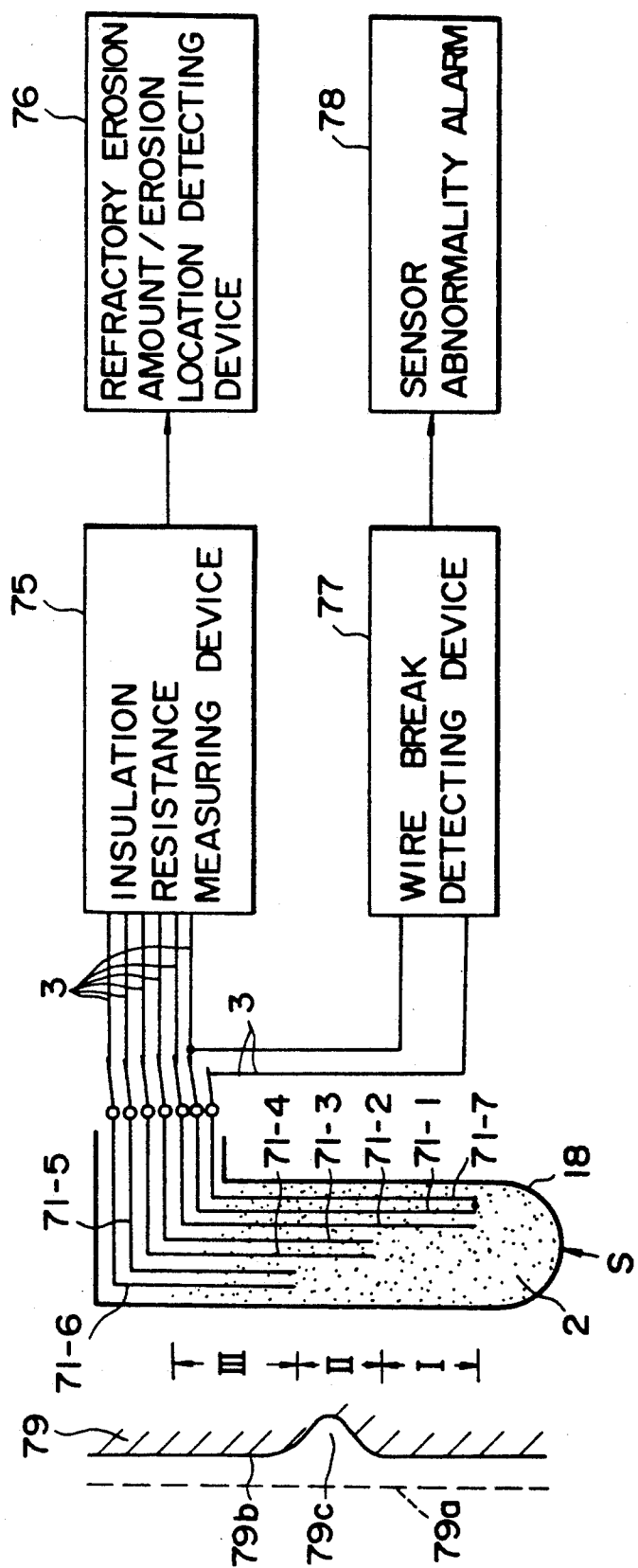
FIG. 46 is a diagrammatic representation showing general construction of a further refractory erosion location measuring device to which the present invention is applied.
Figure 47:
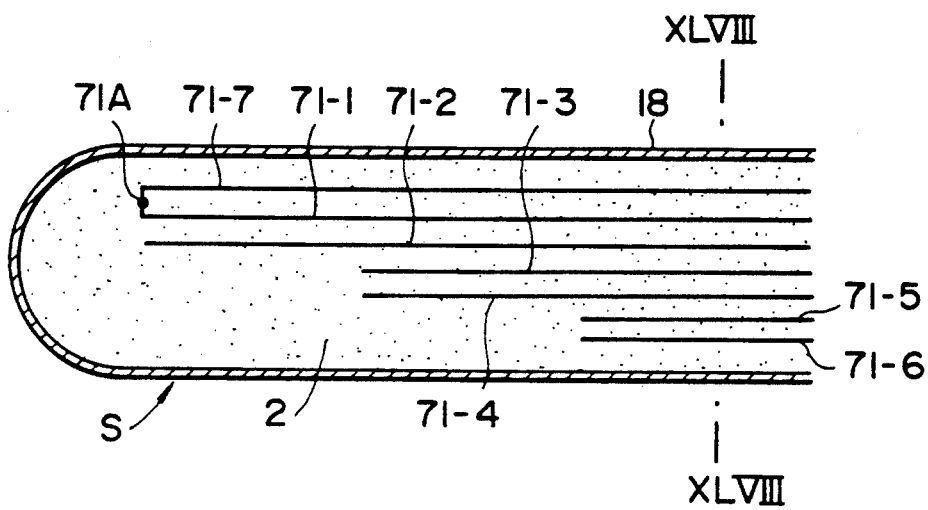
FIG. 47 is a developed longitudinal sectional view showing a sensor of the refractory erosion location measuring device shown in FIG. 46.
Figure 48:
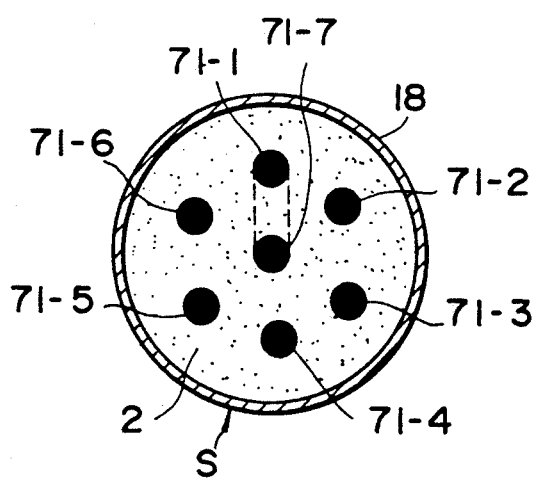
FIG. 48 is a sectional view taken along line XLVIII—XLVIII of FIG. 47.

Referring now to FIGS. 46 to 48, there is shown a further refractory erosion location measuring device to which the present invention is applied. The refractory erosion location measuring device shown includes a sensor S including three pairs of conductors or metal members 71-1 and 71-2, 71-3 and 71-4, and 71-5 and 71-6 in the form of kanthal metal wires, chromel wires, inconel wires or the like disposed in a protecting tube 18 in a predetermined spaced relationship from each other on a same circular line around the center axis of the protecting tube 18 and extending in parallel to each other. The pairs of conductors 71-1 and 71-2, 71-3 and 71-4, and 71-5 and 71-6 are disposed in a predetermined displaced relationship from each other in the axial direction of the protecting tube 18 within monitoring range of a refractory in which the sensor S is incorporated. In the present sensor S, the conductors 71-1 and 71-2 have a maximum length while the conductors 71-5 and 71-6 have a minimum length, and the conductors 71-3 and 71-4 have an intermediate length as seen in FIG. 47. The protecting tube 18 in which the conductors 71-1 to 71-6 are accommodated is made of, for example, SUS, inconel, kanthal or the like, and an insulator or insulating refractory 2 having an insulating resistance which drops as the temperature rises is filled between the conductors 71-1 to 71-6 and in the protecting tube 18. The sensor S is thus provided in a monitoring range of a refractory 79.

Also here, the insulator 2 which is a component of the sensor S may be formed from a similar substance to that of the sensor S described hereinabove with reference to FIGS. 29 or 40.

The sensor S includes an additional conductor 71-7 having the same length as the conductors 71-1 and 71-2 and disposed substantially on the center axis of the protecting tube 18 in parallel to the conductor 71-1. The conductors 71-1 and 71-7 are connected at inner ends thereof at a point 71A to each other. The conductors 71-1 and 71-7 thus constitute a sensor abnormality detecting metal member disposed continuously in the sensor S over the monitoring range of the refractory 79.

Referring to FIG. 46, the conductors 71-1 to 71-7 of the sensor S are individually connected at outer ends thereof to an insulation resistance measuring device 75 by way of lead wires 3.

The insulation resistance measuring device or resistance measuring means 75 measures insulation resistances $R_{1\,2}$, $R_{3\,4}$ and $R_{5\,6}$ between arbitrary ones of the conductors 71-1 to 71-6 in pair of the sensor S by way of the lead wires 3. A refractory erosion amount/erosion location detecting device (discriminating means) 76 is connected to the insulation resistance measuring device 75 for receiving insulation resistance values $R_{1\,2}$, $R_{3\,4}$ and $R_{5\,6}$ from the insulation resistance measuring device 75 and discriminating an amount and a location of erosion of the refractory 79 from the insulation resistance values $R_{1\,2}$, $R_{3\,4}$ and $R_{5\,6}$ received. The refractory erosion location measuring device further includes a wire break detecting device (sensor abnormality detecting means) 77 for measuring a resistance $R_{1\,7}$ between the outer ends of the conductors 71-1 and 71-7 constituting the sensor abnormality detecting metal member and detecting an abnormality or extraordinary condition of the sensor S such as disconnection or breaking of a wire in accordance with a result of such measurement. A sensor abnormality alarm 78 is connected to the wire break detecting device 77 for notifying, when breaking of a wire is detected by the sensor S, such abnormality to an operator and so forth.

It is to be noted that, in FIG. 46, reference character 79a denotes an initial refractory face of the refractory 79, 79b an actual working face of the refractory 79, and 79c an eroded portion of the refractory 79.

With the refractory erosion location measuring device having such construction as described above, the insulation resistance $R_{1\,2}$ between the conductors 71-1 and 71-2, the insulation resistance $R_{3\,4}$ between the conductors 71-3 and 71-4 and the insualtion resistance $R_{5\,6}$ between the conductors 71-5 and 71-6 are continuosly measured by the insulation resistance measuring device 75. At an initial stage after the sensor S has been installed in the refractory 79, the refractory 79 is not yet eroded and still has a sufficient thickness (refer to the initial refractory face 79a). Consequently, the temperature at the location of the sensor S remains low, and the insulation resistance values $R_{1\,2}$, $R_{2\,3}$ and $R_{3\,4}$ measured by the insulation resistance measuring device 75 all exhibit infinite values.

Figure 49A:
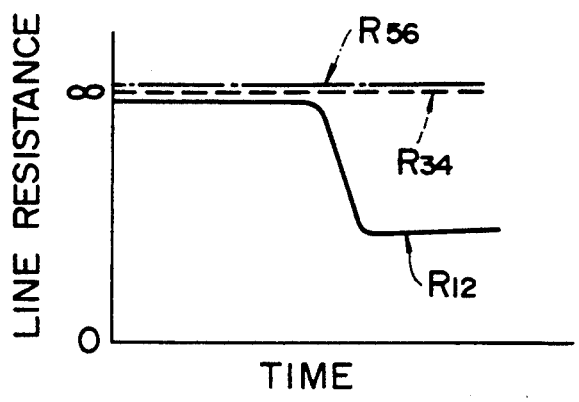
FIGS. 49a, 49b and 49c are graphs illustrating characteristics of an insulator of the sensor shown in FIG. 47.

In this condition, if a local abnormal erosion occurs in the refractory 79 in a region I in FIG. 46, then the temperature at a location around sensor portions in the region I, that is, the conductors 71-1 and 71-2, rises. Consequently, the insulation resistance values $R_{1\,2}$, $R_{3\,4}$ and $R_{5\,6}$ exhibit such variations as shown in FIG. 49a. Accordingly, if an erosion of the refractory 79 appears only in the region I, then only the insulation resistance $R_{1\,2}$ drops, and it is discriminated from this fact that an erosion is proceeding in the region I.

Figure 49B:
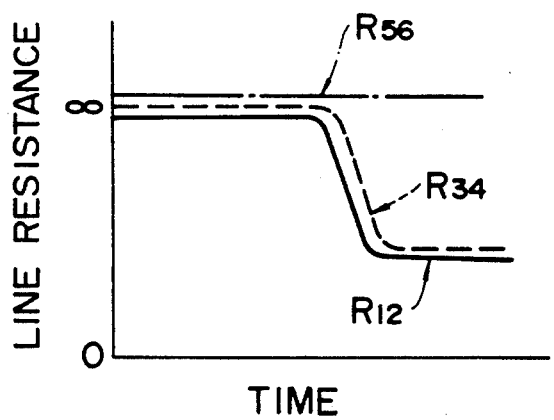
Figure 49C:
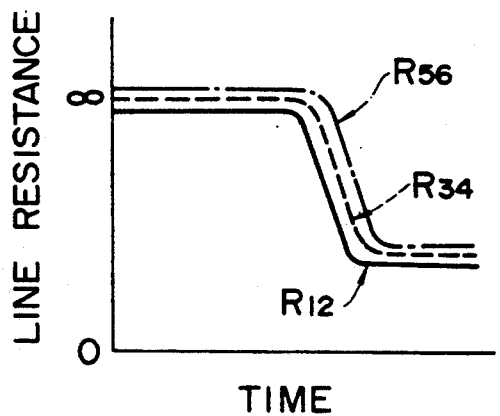
Figure 50:
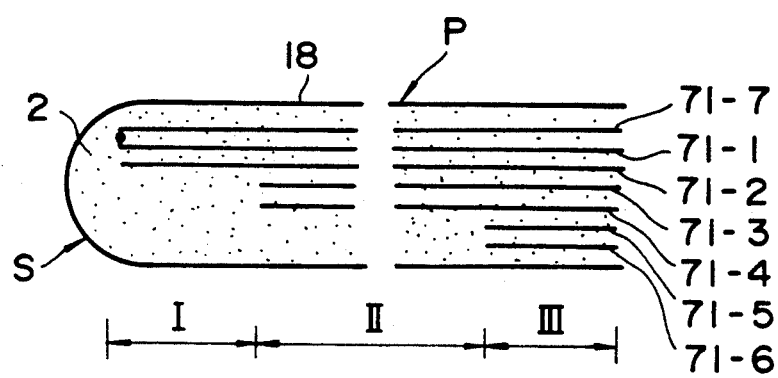
FIG. 50 is a developed longitudinal sectional view illustrating the sensor of FIG. 47 wherein wires are in a broken condition.

In case an abnormal erosion appears similarly in another region II shown in FIG. 46, the insulation resistance values $R_{1\,2}$ and $R_{3\,4}$ drop as seen in FIG. 49b, but otherwise if an abnormal erosion appears in the other region III, then all of the insulation resistance values $R_{1\,2}$, $R_{3\,4}$ and $R_{5\,6}$ drop as seen in FIG. 49c.

From such variations of the insulation resistance values $R_{1\,2}$, $R_{3\,4}$ and $R_{5\,6}$, it is discriminated by the refractory erosion amount/erosion location detecting device 76 in which one of the regions I to III in the monitoring range an abnormal erosion occurs.

Further, the magnitudes of the insulation resistances $R_{1\,2}$, $R_{3\,4}$ and $R_{5\,6}$ measured by the measuring device 75 naturally represent degrees of erosion in the individual regions I, II and III. In particular, as apparent also from FIG. 31, where the resistance value is high, the temperature is low and the amount of erosion is small. To the contrary, where the resistance value is low, it can be determined that the temperature is high and the erosion is proceeding. Such determination is also executed by the refractory erosion amount/erosion location detecting device 76, and a degree of erosion is also determined by the detecting device 76.

Figure 51:
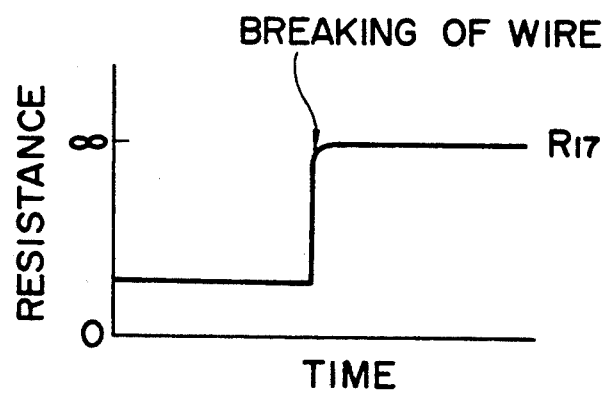
FIG. 51 is a graph illustrating operation of the sensor shown in FIG. 47 when such broken condition of wires is detected.

In addition, with the present refracting erosion location measuring device, the resistance $R_{1\,7}$ between the conductors 71-1 and 71-7 is continuously measured. If the sensor S is free from a failure such as breaking of a wire and is operating regularly, then the resistance $R_{1\,7}$ exhibits a low value of several to several tens ohms. However, if it is assumed, for example, that disconnection or breaking of the conductors 71-1 to 71-4 and 71-7 is caused at a location P in the region II in the sensor S by a thermal stress or the like, then the outer ends of the conductors 71-1 and 71-7 serving as the sensor abnormality detecting metal member is naturally brought out of a mutually conducting condition. Consequently, the resistance $R_{1\,7}$ presents a substantially infinite value as seen in FIG. 51.

Accordingly, an abnormality of breaking of a wire or melting breakdown of the sensor by a thermal stress or the like is detected by monitoring the resistance $R_{1\,7}$ by means of the wire break detecting device 77, and the sensor abnormality alarm 78 can be operated in response to a result of such detection. Consequently, determination of reliability of the sensor S or discrimination of a timing for the replacement can be achieved.

Also the present refractory erosion location measuring device presents similar advantages to those of the refractory erosion location measuring devices described hereinabove with reference to FIG. 29, FIGS. 40 to 42 and FIGS. 44 and 45.

In addition, with the present refractory erosion location measuring device, since an abnormality of the sensor S such as breaking of a wire or melting breakdown by a thermal stress or the like is detected by means of the wire break detecting device 77, it is possible to determine reliability of the sensor S or to discriminate a timing for the replacement of the sensor S. Consequently, the reliability of the refractory erosion location measuring device itself is improved remarkably.

Figure 52:
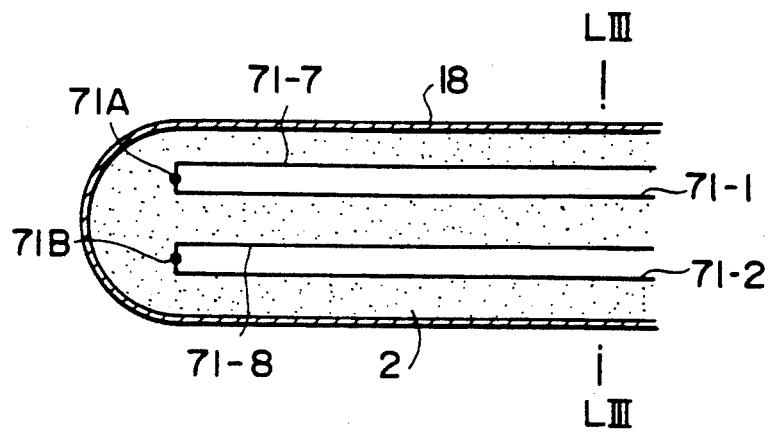
FIG. 52 is a developed longitudinal sectional view of a modification to the sensor of FIG. 47 which employs a modified sensor abnormality detecting metal member.
Figure 53:
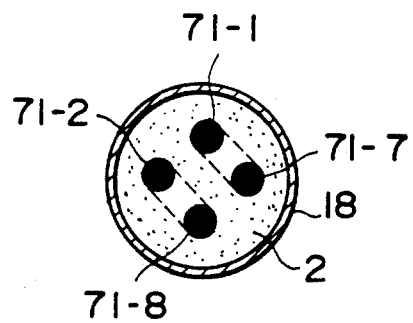
FIG. 53 is a sectional view taken along line LIII—LIII of FIG. 52.

It is to be noted that, while in the arrangement described above the conductors 71-1 and 71-7 are connected at the inner ends thereof at the point 71A to each other to constitute the sensor abnormality detecting metal member, for example, an additional conductor 71-8 may be connected to the conductor 71-2 by way of a point 71B as shown in FIG. 52 to constitute another sensor abnormality detecting metal member. In this instance, the insulation resistance $R_{1\,2}$ may be measured between the conductors 71-1 and 71-2 or 71-7 and 71-8 or otherwise 71-1 and 71-8 or else 71-7 and 71-2 while an abnormality of each conductor is determined in accordance with a conducting condition of the conductors 71-1 and 71-7 and the conductors 71-2 and 71-8. While the conductors 71-7 and 71-8 are shown added to the conductors 71-1 and 71-2 in FIG. 52, if a conductor is added in a similar manner to each of the conductors 71-1 to 71-6 of the sensor shown in FIGS. 46 and 47, detection of disconnection or breaking of a wire can be effected for every one of the conductors, and accordingly, the reliability of the sensor S is further improved.

On the other hand, while the arrangement described above includes up to six conductors for the discrimination of erosion, the present invention is not limited to such specific arrangement.

Further, while the conductors 71-1 to 71-7 of the arrangement described above are made of the same material, where they are constituted otherwise from different metals, thermoelectromotive force which increases in proportion to a temperature at end portions of such conductors can be obtained, and consequently, it is possible to obtain temperature information from the sensor S.

Figure 54:
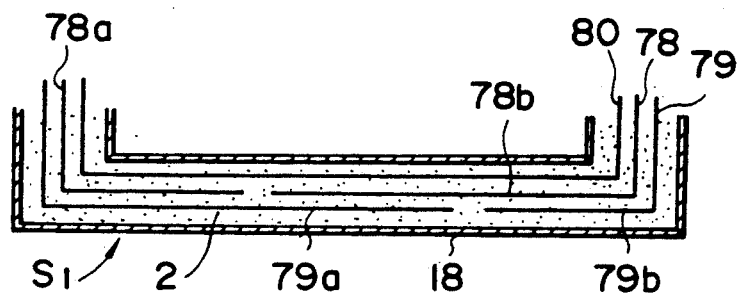
FIG. 54 is a developed longitudinal sectional view showing another modification to the sensor shown in FIG. 47.

In the meantime, while the refractory erosion location measuring device described above employs the sensor S wherein the three pairs of conductors 71-1 to 71-6 are disposed in a displaced relationship in the longitudinal direction of the sensor S, the present invention can be applied to such some other sensor as, for example, shown in FIG. 54. Referring to FIG. 54, the sensor denoted at $S_1$ includes two conductors 78 and 79 accommodated in a protecting tube 18. The conductors 78 and 79 are individually cut at different locations in a longitudinal direction of the sensor S into conductor sections 78a, 78b, and 79a, 79b, respectively. Then, the sensor $S_1$ is incorporated in the refractory erosion location measuring device shown in FIG. 46 in place of the sensor S, and insulation resistance values between two arbitrary ones of the conductor sections 78a, 78b and 79a, 79b, that is, an insulation resistance value Rac between the conductor sections 78a and 79a, another insulation resistance value Rbc between the conductor sections 79a and 79b and a further insulation resistance value Rbd between the conductor sections 78b and 79b, are measured by means of the insulation resistance measuring device 75. Thus, an amount and a location of erosion of the refractor 64 are discriminated by the refractory erosion amount/erosion location detecting device 76. The sensor $S_1$ further includes an additional conductor 80 disposed continuously over a monitoring range of a refractory and serving as a sensor abnormality detecting metal member. By monitoring a resistance between the opposite ends of the conductor 80 by means of the wire brake detecting device 77, an abnormality of the sensor $S_1$ can be detected in a similar manner as in the refractory erosion location measuring device shown in FIG. 46.

Figure 55:
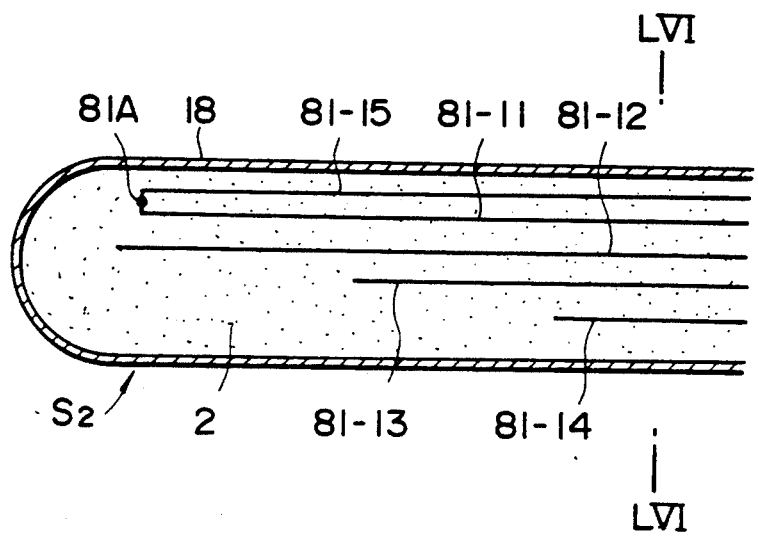
FIG. 55 is a developed longitudinal sectional view showing a further modification to the sensor shown in FIG. 47.
Figure 56:
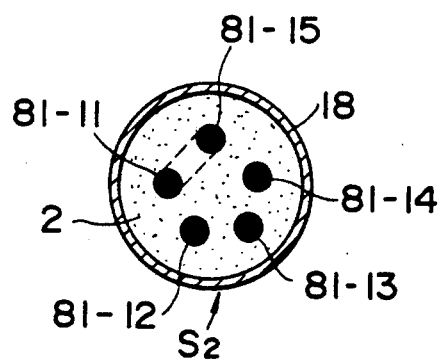
FIG. 56 is a sectional view taken along line LVI—LVI of FIG. 55.

Such a sensor $S_2$ as shown in FIGS. 55 and 56 can also be utilized in order to realize similar effects to those of the refractory erosion location measuring device shown in FIG. 46 while decreasing the number of conductors. In particular, a sensor abnormality detecting metal member is constituted from conductors 81-11 and 81-12 so that an abnormality of the sensor $S_2$ such as disconnection or breaking of a wire may be detected between the conductors 81-11 and 81-15. Meanwhile, if insulation resistance values are measured between the conductors 81-11 and 81-12, between the conductors 81-12 and 81-13 and between the conductors 81-13 and 81-14, then refractory erosion in any of three regions can be detected.

Having now fully described the invention, it will be apparent to one of ordinary skill in the art that many changes and modifications can be made thereto without departing from the spirit and scope of the invention as set forth herein.

What is claimed is:

1. A sensor for simultaneously monitoring temperatures of a plurality of regions within a tube, and providing a signal indicative of the temperature in a hottest one of said plurality of regions, comprising:

first and second metal electrodes, both electrodes having a first length and essentially consisting of the same metal, which are parallel and spaced apart at a fixed distance, each electrode extending over the regions to be monitored within the tube;

wherein said first electrode (27-1) extends along a central axis of said tube and said second electrode (27-2) extends parallel thereto;

a third electrode (27-3) having a second length which is shorter than said first length and extending parallel to the first electrode within the tube;

a fourth electrode (27-4) having a third length which is shorter than said second length and extending parallel to said first electrode within said tube;

wherein said second, third and fourth electrodes define a radial array surrounding said first electrode;

an insulating substance (2) filling the volume between said electrodes and extending over the regions to be monitored, said insulating substance having a resistivity which continuously decreases with increasing temperature, within a temperature range to be monitored which is between 800° C. and a melting point of the electrodes, said substance remaining solid over said range; and wherein current flowing from one electrode, through the insulating substance, to another electrode, is shunted to the region having a highest temperature, due to a lower resistance of the insulating substance in said region having the highest temperature, thereby providing an output signal corresponding to resistance of said region having the highest temperature.

2. A sensor for monitoring temperature, as recited in claim 1, wherein said temperature range to be monitored is between 800 and 1500 degrees centigrade.

3. A sensor for monitoring temperature, as recited in claim 1, wherein said insulating substance consists essentially of one of magnesium oxide and high purity alumina.

4. A sensor according to claim 1, wherein said metal electrodes are opposed to each other only within a particular region within the monitoring range of the refractory.

5. A sensor according to claim 1, wherein said metal electrodes are a pair of metal plates having a high melting point and disposed in a parallel opposing relationship to each other.

* * * * *